United States Patent
Kofman et al.

(10) Patent No.: US 7,529,722 B2
(45) Date of Patent: May 5, 2009

(54) AUTOMATIC CREATION OF NEURO-FUZZY EXPERT SYSTEM FROM ONLINE ANLYTICAL PROCESSING (OLAP) TOOLS

(75) Inventors: Gene I. Kofman, Parkland, FL (US); Serguei A. Lyssenkov, Voronezh (RU); Rouslan V. Lobachev, Voronezh (RU)

(73) Assignee: Dintecom, Inc., Parkland, FL (US)

( * ) Notice: Subject to any disclaimer, the term of this patent is extended or adjusted under 35 U.S.C. 154(b) by 381 days.

(21) Appl. No.: 11/020,542

(22) Filed: Dec. 22, 2004

(65) Prior Publication Data

US 2005/0149459 A1    Jul. 7, 2005

Related U.S. Application Data

(60) Provisional application No. 60/532,146, filed on Dec. 22, 2003.

(51) Int. Cl.
*G06F 17/00* (2006.01)
*G06N 7/00* (2006.01)

(52) U.S. Cl. .............................. 706/59; 707/2; 707/100

(58) Field of Classification Search ...................... 707/2, 707/100; 706/46, 45, 44; 431/12
See application file for complete search history.

(56) References Cited

U.S. PATENT DOCUMENTS

| | | | |
|---|---|---|---|
| 5,993,194 A * | 11/1999 | Lemelson et al. | 431/14 |
| 6,418,427 B1 * | 7/2002 | Egilsson et al. | 707/2 |
| 6,581,068 B1 * | 6/2003 | Bensoussan et al. | 707/104.1 |
| 6,813,615 B1 * | 11/2004 | Colasanti et al. | 706/46 |

* cited by examiner

*Primary Examiner*—David R Vincent
*Assistant Examiner*—Kalpana Bharadwaj
(74) *Attorney, Agent, or Firm*—Jon Gibbons; Fleit Gibbons Gutman Bongini & Bianco P.L.

(57) ABSTRACT

A method for automatic generation of a Neuro-Fuzzy Expert System (Fuzzy Logic Expert System implemented as a Neural Network) from data. The method comprising a Data Interface allowing description of location, type, and structure of the Data. The Interface also allows designation of input attributes and output attributes in the Data Structure; automatic Neuro-Fuzzy Expert System generation driven by the Data; Training of the Expert System's Neural Network on the Data and the presentation of results which include new knowledge embedded in the parameters and structure of the trained Neuro-Fuzzy Expert System to a user.

18 Claims, 26 Drawing Sheets

Product Group ▼
AC PRODUCTS

| Year | Quarter/Period | Invoice Date | Region ▼ AD Units | Avg Unit Price | Gross Profit | MW Units | Avg Unit Price | Gross Profit | NE Units | Avg |
|---|---|---|---|---|---|---|---|---|---|---|
| 2003 | Q1 | | | | | | | | | |
| | Q2 | | 133 | $52.43 | $473.61 | 29,967 | $34.88 | $322,206.38 | 15,787 | |
| | | 2003-04 May | 70 | $98.29 | $3,144.00 | 21,038 | $33.37 | $256,524.06 | 11,797 | |
| | | 2003-05 June | | | | 250 | $34.70 | $3,521.86 | 4 | |
| | | 06/01/2002 | 3 | $57.24 | $42.73 | 2,620 | $28.79 | $27,853.87 | 521 | |
| | | 06/03/2002 | 3 | $136.11 | $114.57 | 2,022 | $35.35 | $26,739.96 | 507 | |
| | | 06/04/2002 | | | | 1,241 | $45.57 | $20,732.51 | 826 | |
| | | 06/05/2002 | 1 | $93.46 | $48.04 | 1,747 | $29.64 | $19,096.63 | 1,104 | |
| | | 06/06/2002 | 1 | $237.20 | $121.70 | 1,064 | $36.57 | $14,289.99 | 719 | |
| | | 06/07/2002 | | | | 292 | $23.92 | $2,621.00 | 71 | |
| | | 06/08/2002 | 1 | $61.80 | $5.66 | 2,083 | $40.82 | $32,980.42 | 403 | |
| | | 06/10/2002 | 2 | $75.63 | $57.05 | 2,757 | $32.14 | $33,392.60 | 937 | |
| | | 06/11/2002 | 1 | ($74.45) | ($61.86) | 1,590 | $50.96 | $30,432.37 | 735 | |
| | | 06/12/2002 | 1 | $174.05 | $59.76 | 1,847 | $35.08 | $25,328.86 | 628 | |
| | | 06/13/2002 | 3 | $125.00 | $97.10 | 1,325 | $30.75 | $15,115.37 | 363 | |
| | | 06/14/2002 | | | | 121 | $49.66 | $339.70 | (5) | |
| | | 06/15/2002 | 2 | $75.50 | $23.31 | 1,712 | $31.97 | $19,993.11 | 530 | |
| | | 06/17/2002 | 1 | $65.50 | $18.25 | 1,358 | $42.97 | $23,198.67 | 583 | |
| | | 06/18/2002 | 1 | $83.20 | $37.91 | 1,379 | $48.06 | $25,524.13 | 616 | |
| | | 06/19/2002 | | | | 2,028 | $34.97 | $26,860.64 | 679 | |
| | | 06/20/2002 | 3 | $97.20 | $203.11 | 1,719 | $43.94 | $29,348.57 | 549 | |
| | | 06/21/2002 | | | | 369 | $31.95 | $4,569.04 | 21 | |
| | | 06/22/2002 | 3 | $81.53 | $16.28 | 2,335 | $49.76 | $44,708.89 | 554 | |
| | | 06/24/2002 | 6 | $99.31 | $202.52 | 2,236 | $45.34 | $37,813.74 | 1,211 | |
| | | 06/25/2002 | 1 | $89.60 | $26.40 | 2,426 | $45.47 | $42,782.15 | 1,125 | |
| | | 06/26/2002 | 3 | $101.23 | $119.23 | 2,962 | $32.62 | $37,875.93 | 1,520 | |
| | | 06/28/2002 | 2 | $41.89 | $32.44 | 1,896 | $31.84 | $21,652.48 | 838 | |
| | | 06/29/2002 | | | | 136 | $22.12 | $352.50 | (8) | |
| | | Total | 38 | $92.29 | $1,164.20 | 39,515 | $38.00 | $567,424.99 | 15,031 | |
| | | 2003-06 July | 41 | $123.48 | $1,960.79 | 36,884 | $40.44 | $544,201.02 | 19,023 | |
| | Total | | 149 | $103.69 | $6,268.99 | 97,437 | $37.92 | $1,367,850.07 | 45,851 | |
| | Q3 | | 43 | $107.34 | $1,522.44 | 26,170 | $43.28 | $384,658.61 | 11,552 | |
| | Q4 | | | | | | | | | |

FIG. 2

Voucher Status:

0 – Voucher is Current
1 – Voucher is Overdue

Boolean Term sets:

Horizontal straight lines.
Voucher changes its status from Current to Overdue on the 30$^{th}$ day. Thus a 25 day old voucher is still completely Current.

Fuzzy Term sets:

Gaussian curves.
Voucher gradually changes its status from Current to Overdue. Thus a 25 day old voucher is mostly Overdue.

AUTOMATIC CREATION OF NEURO-FUZZY EXPERT SYSTEM FROM ONLINE ANLYTICAL PROCESSING (OLAP) TOOLS

CROSS-REFERENCED APPLICATIONS

This Application is based upon and claims priority from prior Provisional Patent Application No. 60/532,146, filed on Dec. 22, 2003 with inventors Gene I. Kofman, Serguei A. Lyssenkov, and Rouslan V. Lobachev, and commonly assigned here with to Dintecom, Inc. the entire disclosure of which is herein incorporated by reference.

PARTIAL WAIVER OF COPYRIGHT

All of the material in this patent Application is subject to copyright protection under the copyright laws of the United States and of other countries. As of the first effective filing date of the present Application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

The present invention generally relates to the fields of Artificial Intelligence (AI), Data Mining (DM), and Knowledge Discovery in Databases (KDD), Business Intelligence (BI), and Fuzzy Logic Expert Systems. More specifically the present invention relates to automating creation of Neuro-Fuzzy Expert Systems.

2. Description of Related Art

In the current knowledge economy mountains of data are getting accumulated in various Databases scattered around the enterprise. But the key to gaining competitive advantage lies in deriving insight and intelligence from this data. The amount of data that requires processing and analysis in a large Database exceeds human analytical capabilities, and the difficulty of accurately transforming relational data into useful information, i.e. knowledge, surpasses the limits of traditional Databases and online analytical processing (OLAP) tools.

Therefore, the full utilization of stored data depends on the use of Knowledge Discovery techniques. Knowledge Discovery is a non-trivial extraction of implicit, unknown, and potentially useful information (such as logic rules, constraints, and regularities) from data. The explosive growth in data and Databases used in business management, government administration, and scientific Data Analysis has created a need for tools that can Automatically transform the data into useful information and knowledge.

One such information retrieval technique—Online Analytical Processing (OLAP) became increasingly popular. However, the combination of OLAP Cube's Dimensions and Measures provides a significant amount of precise data which often times obscures its meaning. OLAP requires a lot of time from trained analytical personnel, and it because this required investment of time that many times forces organizations to abandon their investments into Business Intelligence tools. A quote from L. Zadeh captures this tradeoff between producing data and gaining knowledge: "As complexity rises, precise statements lose meaning and meaningful statements lose precision."

Various Expert Systems meant to deal with the "precision vs. meaning" dilemma by automating Data Analysis. Boolean logic based Expert Systems are open to programmatic implementations, but they do not reflect uncertainty and imprecision of the natural environment forcing industries to create simplified models of business procedures and production processes. Fuzzy Logic Expert Systems while allowing to "program with words" (L. Zadeh) (e.g. "IF VoucherAge IS Current AND Discount IS High THEN PayDate is Later") still suffer from the main problem of any Expert System—dependency on a Rule Base which is not always possible for an expert to formulate (e.g. automobile driving).

Neural networks do not require a Rule Base; they are universal model-free process approximators. However, they are 'black boxes' and it is impossible to extract knowledge and useful information from a Neural Network.

Therefore, a need exists to create a Hybrid Expert System. Neural networks and Fuzzy Logic Expert Systems share the common ability to deal with difficulties arising from uncertainty, imprecision, and noise in the natural environment. Fuzzy Logic Expert System implemented as a Neural Network derives its Rule Base from data. The Rule Base inferred by the process of Neural Network Training represents the new knowledge. Neural network allows for the system learning and noise tolerance. Fuzzy Logic provides for the Neural Network's manageable structure and eliminates opacity of its Internal Layers. In addition, a Hybrid Neuro-Fuzzy Expert System allows infusing of high level thinking into Neural Networks by Manually entering some expert rules.

One problem with the existing software implementations of the Neuro-Fuzzy Expert Systems is that such systems are usually created to solve one particular problem or to approximate or control one specific process. The structure and parameters of such neuro-fuzzy system have to be redefined to work with another problem Domain.

Another problem is that existing software implementations of the neuro-fuzzy systems lack intuitive user Interface which would provide for easy (wizard-like) creation of an Expert System allowing quickly creating and testing multiple versions of the same process approximators to find the best approach.

Yet another problem with the neuro-fuzzy systems is that structure and parameters of such systems are designed to solve one type of problem, for example Function Approximation, and not another, for example Fuzzy Logic Controller or Classifier.

Yet another problem is that many software implementations of the neuro-fuzzy systems do not provide for automatic structure and parameter generation solely from sample data.

Yet another problem is that existing neuro-fuzzy software tools do not Interface with various types of data (e.g. text files, spreadsheets, relational Databases, OLAP Cubes).

Yet another problem with the existing neuro-fuzzy software tools is that they cannot Dynamically interact with OLAP Cubes. A lot of effort went into design and population of OLAP Cubes for different industries. OLAP Cubes incorporate results of business understanding, data understanding, and data preparation, which are crucial steps of the Knowledge Discovery process (see CRISP-DM process description at www.crisp-dm.org). Returns on investments into the Cubes creation could have been significantly higher if the unwieldy Cubes were analyzed Automatically by a neuro-fuzzy software tool.

Yet another problem with the current neuro-fuzzy software tools is lack of illustrative decision support presentation tools (e.g. Graphic models, Bubble Charts, Graphs, etc.).

Yet another problem is that many parameters of the existing neuro-fuzzy software tools require manual adjustment, which can be performed only by an expert in both the software tool and the problem Domain.

Yet another problem with some software implementations of Neuro-Fuzzy Expert Systems is lack of tunable parameters (e.g. at the input Term Sets Integration, output Term Sets Aggregation, or Defuzzification stages), which makes it difficult to approximate underlying process.

Yet another problem is that most of the implementations require an expert to define Term Sets on Input and Output Variables' universes of discourse.

SUMMARY OF THE INVENTION

Briefly, in accordance with the present invention, disclosed is a system, method and computer readable medium for automatic generation of a Neuro-Fuzzy Expert System from data.

In an embodiment of the present invention, the method includes Data Interface. The Interface allows describing location (e.g. local or network storage resource such as a file on a hard disk), type (crisp continuous, crisp categorical, fuzzy), and structure of the data (text file, spreadsheet, relational Database, OLAP Cube, Multidimensional Database, chart, and more). It also allows defining the data's input and outputting Attributes. Each input Attribute becomes a Neuron in the Input Layer of the underlying Neural Network (e.g. product code, season). Each output Attribute becomes a Neuron in the Output Layer (e.g. profit). The process of Expert System generation continues with Clustering Automatically performed on each of the input and output Attributes' data with all Clustering parameters determined from the data. Fuzzy Term Sets are Automatically formed around cluster centers for each Attribute. Input Term Sets are created on input Attributes (e.g. product code is AC, season is summer). Each input Term Set is represented by a Neuron in the input Term Set Layer that is linked to a corresponding Neuron in the Input Layer. Output Term Sets are created on output Attributes (e.g. Profit is High). Each output Term Set is represented by a Neuron in the output Term Set Layer that is linked with a corresponding Neuron in the Output Layer. One more Layer, called Fuzzy Rules Layer, is Automatically added to the underlying Neural Network between the input Term Sets Layer and the output Term Sets Layer. Each Neuron in the Fuzzy Rules Layer represents and is linked to a unique combination of the Neurons from the input Term Sets Layer corresponding to the different input Attributes (e.g. Product Code is AC AND Season is Summer). Initial Rule Base is created by fully linking each Neuron in the Fuzzy Rules Layer with each Neuron in the output Term Set Layer (e.g. IF Product Code is AC AND Season is Summer THEN Profit is High). Next, Weights of the Links between Fuzzy Rules and the output Term Set Layers are determined by Competitive Learning or a similar Neural Network Training algorithm with possible elimination of the weak rules. With the network structure complete, Term Sets' parameters on input and output universes of discourse are trained by a Backpropagation and Genetic algorithms using one of the simplified Integration (Min), Aggregation (Max), and Defuzzification methods (e.g. Center of Gravity). Neural network output Term Sets Aggregation and input Term Sets Integration parameters (e.g. S-OWA operators) are trained by at least one of Genetic Algorithm and a Fuzzy Logic Controller like system. In one embodiment of the invention, Defuzzification is parameterized by Confidence Levels spread over the output Universe Of Discourse. Values of the Confidence Levels are trained by the Genetic Algorithm which utilizes at least one of Combinability Relationship and distribution of Error differential in its Crossover operation. Training of the Defuzzification parameters concludes the automatic generation of the Neuro-Fuzzy Expert System. The entire process is driven by the Data.

In one embodiment of the invention an OLAP Cube's data is analyzed. In this embodiment of the invention, a two Dimensional view of the OLAP Cube is created first, through the OLAP user Interface. Cube's Dimensions are showed in the view's rows and Cube's Measures are showed in the view's columns. Input Attributes are then Automatically defined from the view's row Dimensions and output Attributes are defined from the view's column Dimensions. Clusters are determined on the Cube input and output Attributes' data. A Fuzzy Term Set is created for each input and output cluster. During Descriptive Operation, input Term Sets are related through the trained Neural Network to the output Term Sets revealing OLAP Cube's data Patterns and presenting the new knowledge in an understandable manner (e.g. IF Invoice Date IS Winter AND Product Group IS Thermal products THEN Sales Amount IS High). During Predictive Operation, the trained Neuro-Fuzzy Expert System determines output values based on the input values (e.g. IF Invoice Date=360 AND Product Group=Thermal THEN Sales Amount=$56,000). In that embodiment of the invention the method includes an interactive loop wherein user decides whether to create another view of the Cube's data and send a different set of data to the Application for Neuro-Fuzzy Expert System generation for analysis.

The present invention has been shown to be advantageously applied to Applications: function and process Approximation, classification, automatic Graph analysis, process control, Knowledge Discovery in Databases, Business Intelligence, Forecasting, Decision Support, detection of out of Pattern transactions.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, one or two of the left-most digits (all digits starting from the third position from the right) of a reference number identifies the drawing in which the reference number first appears.

FIG. 2 is a screenshot of one embodiment of a GUI of an OLAP User Interface 106 of FIG. 1.

DETAILED DESCRIPTION OF THE PREFERRED EMBODIMENTS

Figure 1:
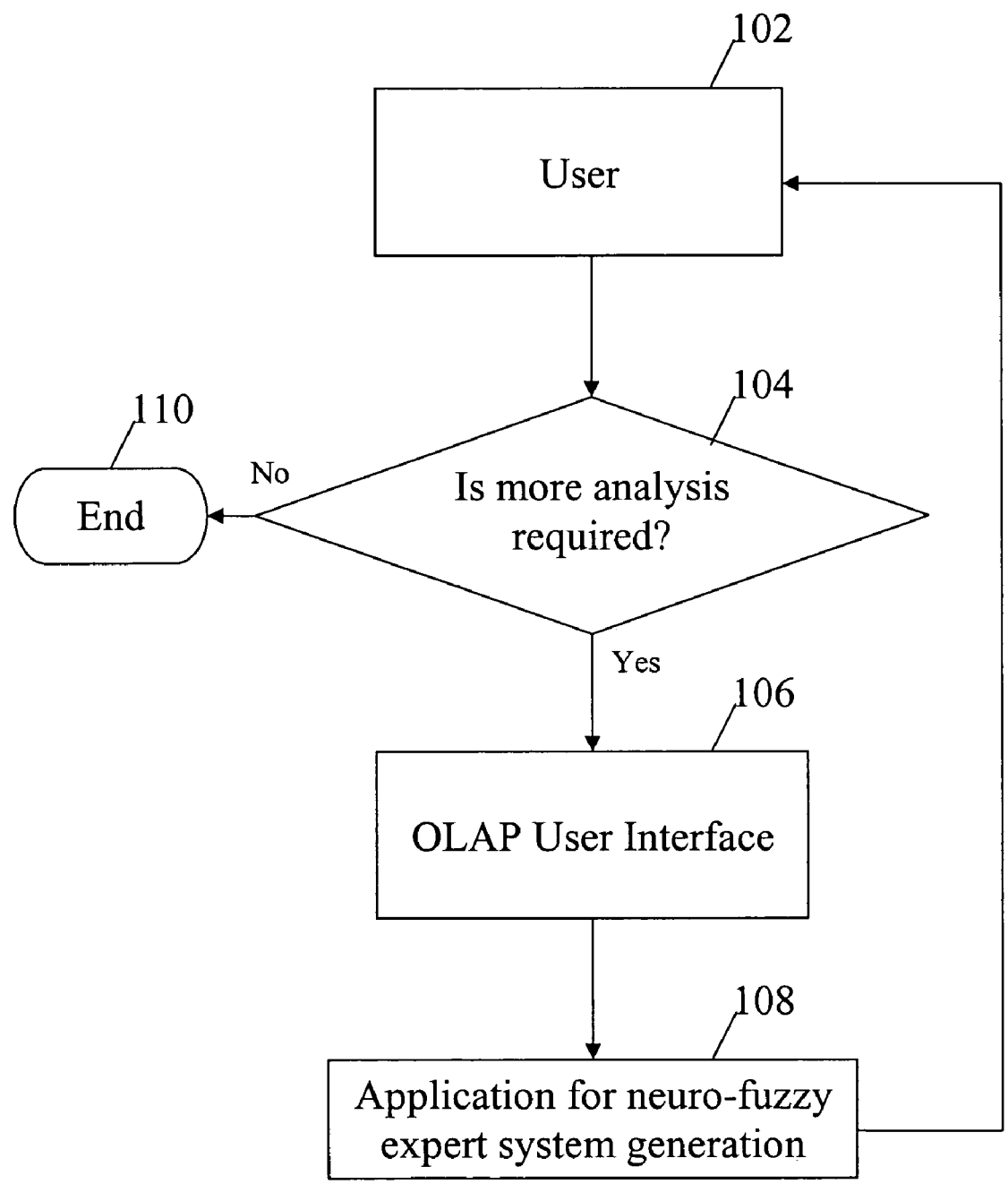
FIG. 1 is a flow diagram illustrating the overall system flow of one embodiment of the present invention.

Glossary Of Terms Used In This Disclosure

Aggregation—in Fuzzy Logic Expert System, operation of combining of the Consequent of each Fuzzy Rule.

Antecedent—in Fuzzy Logic Expert System, initial (or "IF") part of a Fuzzy Rule. Fuzzy Rule premise.

Application—a computer program designed for a specific task or use.

Approximation—creation of a Neural Network which produces the same outputs as a given function or process when it is fed the same inputs.

Artificial Intelligence (AI)—computer software mimicking human thought and cognitive process to solve complex problems Automatically.

Attribute—in Database, a designator for a single piece of information (e.g. Product Price).

Automatically—operating in a manner essentially independent of external inputs including operating without input from a user of the system.

Backpropagation—a Neural Network Training algorithm.

BADD—Basic Defuzzification Distributions a parameterized Defuzzification method.

Boolean Logic—two valued logical system. Truth values in Boolean logic take only one of two values: True or False. The truth values are often expressed as 0 or 1.

Bubble Chart—an outline map that compares sets of three values. Two values are displayed as X and Y coordinates of bubble centers and the third value is displayed as the size of the bubble marker.

Business Intelligence (BI)—gathering, management, and analysis of vast amounts of data in order to gain insights for strategic business decisions.

Categorical Data Type—data represented by alpha-numeric categories. For example, Product Code can assume value of AC.

CBADD—Customizable Basic Defuzzification Distributions a parameterized Defuzzification method.

Center of Gravity (COG)—in Fuzzy Logic, one of the Defuzzification methods.

Classifier—software tool that assigns objects to one of the predefined classes based on their features.

Clustering—process of finding similar elements in a Dataset. It divides the Dataset so that Records with a similar content are in the same group called cluster, and clusters are as different as possible from each other.

Cluster Validity Index—a Measure of a Clustering process quality.

Combinability Relationship—degree of appropriateness of combining two possible solutions during Defuzzification.

Competitive Learning—a Neural Network Training algorithm.

Confidence Level—parameter utilized in BADD Defuzzification method.

Consequent—final (or "THEN") part of a Fuzzy Rule. Fuzzy Rule conclusion.

Continuous Data Type—numeric data that can assume any value within its Universe Of Discourse.

Crisp Data Type—data represented by real numbers.

Crisp Output—real number produced by Defuzzification process.

Crossover—a step in the Genetic algorithm.

Cube—in OLAP, a collection of multidimensional data.

Data—set of values of Input and Output Variables.

Data Mining—process of extracting trends or Patterns from data.

Database—collection of digital information organized by Attributes/fields, Records, and Tables/files. An Attribute is a designator for a single piece of information, a Record is a collection of Attributes, and a Table is a collection of Records.

Data Analysis—process to gain insight into the meaning contained in Databases.

Data Cell—in OLAP, a single data point that occurs at the intersection defined by selecting one member from each Dimension in a multidimensional array. For example, if the Dimensions are Measures, season, and product, then the Dimension members: Profits, Summer, Soft Drinks specify a precise intersection along all Dimensions that uniquely identifies a single Data Cell, which contains the value of Soft Drinks Summer Profits.

Dataset—collection of related data.

Decision Support Systems (DSS)—interactive computer-based systems intended to help decision makers utilize data and models to identify and solve problems and make decisions.

Decision Tree—a tree-like way of representing a collection of hierarchical rules that lead to a class or value.

Degree of Membership—output of a Membership Function. It is always limited to between 0 and 1.

Defuzzification—in Fuzzy Logic Expert System, process of transforming a fuzzy output of a Fuzzy Inference System into a crisp output: number or category.

Descriptive Operation—utilization of a Neuro-Fuzzy Expert System to elucidate Patterns in the Input Data.

Dimension—in OLAP, a structural Attribute of a Cube that is a list of members, all of which are of a similar type in the user's perception of the data. For example, all months, quarters, years, etc., make up a time Dimension.

Dimension Member—in OLAP, a discrete name or identifier used to identify a data item's position and description within a Dimension. For example, Spring is a member of a Season Dimension.

Domain—problem environment for which knowledge is captured in a Knowledge Base.

Dynamically—characterized by continuous change, activity, or progress.

Error—difference between result produced by Fuzzy Logic Expert System and current Output Data.

Expectation—average value of a Term Set with Gaussian Membership Function.

Expert system—program utilizing Knowledge Base and Inference Engine to respond to a user's request for advice.

Filter—data selection condition.

Fitness Calculation—step in the Genetic algorithm.

Forecast—to estimate or calculate in advance, to predict.

Function Approximation—task performed by a Neural Network trained to respond to inputs with an Approximation of a desired function. Fuzzy Data Type—data represented by Fuzzy Numbers.

Fuzzy Inference System—in Fuzzy Logic Expert System, a module that uses fuzzy reasoning to map an input space to an output space.

Fuzzy Logic—multi-valued logical system. Truth values in Fuzzy Logic system range from 0 to 1. Fuzzy Logic allows mathematical formulation of notions like "high sales" or "low price".

Fuzzy Logic Controller—a Rule Based methodology in which system inputs (observables) are related to system outputs (controllables). The formulation of a Fuzzy controller is not model based; that is, the rules, which govern the controller, are not necessarily derived from a physics-based model of the system. Rather, the designer describes in approximate or vague terms the relationships between quantities thought or desired to hold true. With Fuzzy Logic a controller may be designed to employ experience and common sense knowledge, since rules-of-thumb exist mainly in the form of linguistic statements that are usually, but not always, true.

Fuzzy Logic Expert System—form of Artificial Intelligence that uses collection of Membership Functions and rules to reason about data.

Fuzzy Number—imprecise characterization of a numeric information, e.g. "about 1000", "below 200". Fuzzy subsets of the set of real numbers.

Fuzzy Rule—logical expression connecting input linguistic values with output linguistic values. For example: IF Packaging is Small THEN Profit is High.

Fuzzy Set—a set characterized by Degree Of Membership of its elements. Fuzzy set can contain elements with only a partial Degree Of Membership.

Fuzzyfication—process of generating Membership values for an Input Variable using Membership Functions.

Gaussian Function—function often used to describe probability distribution of random variables.

Genetic Algorithm—a method of simulating the action of evolution within a computer.

Graph—a diagram that exhibits a relationship, between two sets of numbers as a set of points having coordinates determined by the relationship.

GUI (Graphical User Interface)—an Interface for issuing commands to a computer utilizing a pointing device, such as a mouse, as well as a keyboard by manipulating and activating Graphical images (icons, pictures, and menus) on a monitor.

Hybrid—something of mixed composition.

Inference Engine—software providing reasoning mechanism in an Expert System.

Input Data—set of values of Input Variables.

Input Layer—in Neural Network, a Layer whose inputs are fed from the outside world.

Input Variable—data Attribute used as an independent variable. Known data value. For example: Price, Region.

Integration—in Fuzzy Logic Expert System, process of combining Antecedent parts of the Fuzzy Rules.

Interface—point of interaction between two pieces of hardware, software, or a user and an Application.

Internal Layer—in Neural Network, a Layer whose inputs are fed from the other Layers of the network and whose outputs are fed to the other Layers of the same network.

Knowledge Base—part of an Expert System containing collection of facts and "if . . . then . . . " rules. The rules represent knowledge of a Domain expert.

Knowledge Discovery—non-trivial extraction of implicit, unknown, and potentially useful information from data. (U. M. Fayyad, G. Piatetsky-Shapiro, P. Smyth, and R. Uthurusamy. Advances in Knowledge Discovery and Data Mining, MIT Press, 1996, which is hereby incorporated by reference in its entirety).

Layer—in a Neural Network, a group of Neurons that have a specific function and are processed as a whole.

Linguistic Value—label associated with a Fuzzy Set, e.g. "Large", "Low".

Link—in a Neural Network, connection between two Neurons.

Manually—operating according to a user input.

Max—maximum operation used in Aggregation

Measure—in OLAP, one of the basic elements of a multidimensional Cube containing data of a key performance indicator (e.g. Sales).

Membership—in Fuzzy Logic, a degree to which a given value belongs to a Fuzzy Set.

Membership Function—function that maps values to Memberships.

Min—minimum operation used in Integration

Multidimensional Data—a group of Data Cells arranged by the Dimensions of the data. For example, a spreadsheet exemplifies a two-Dimensional array with the Data Cells arranged in rows and columns, each being a Dimension. A three-Dimensional array can be visualized as a Cube with each Dimension forming a side of the Cube, including any slice parallel with that side. Higher Dimensional arrays have no physical metaphor, but they organize the data in the way users think of their enterprise. Typical enterprise Dimensions are time, Measures, products, geographical regions, sales channels.

Multidimensional Database—a Database with Attributes contain collections of data structures, instead of being a single piece of information. For example, an Attribute can contain values and each value can contain subvalues, etc.

Neural Network—artificial network of connected Neurons. Each Neuron performs a simple calculation that is a function of the activations of the Neurons that are connected to it. The network as a whole is capable of performing extremely complicated tasks, including universal computation and universal Approximation.

Neuron—in a Neural Network, a simple computational unit that performs a Weighted sum on incoming signals, adds a Threshold term to this value, and translates the result to its output.

Neuro-Fuzzy Expert System—Fuzzy Logic Expert System built and trained as a Neural Network.

Neuro-Fuzzy System Structure—configuration of the underlying Neural Network. For example, number of Layers, number of Neurons in each Layer, number of Links between the Neurons.

Neuro-Fuzzy System Parameters—characteristics of the underlying Neural Network. For example, Term Sets' Membership Function shapes, Term Sets coordinates, Link Weights.

OLAP—On-Line Analytical Processing is a category of software technology that enables analysts, managers and executives to gain insight into data through fast, consistent, interactive access to a wide variety of possible views of information that has been transformed from raw data to reflect the real Dimensionality of the enterprise as understood by the user.

Output Data—set of values of Output Variables.

Output Layer—in Neural Network, a Layer whose outputs are passed to the world outside the network.

Output Variable—data Attribute used as a dependent variable. Data value to be computed. For example: Profit.

Pattern—a consistent characteristic.

Predictive Operation—utilization of a Neuro-Fuzzy Expert System to Forecast values of Output Variables from known values of Input Variables.

Record—in Database, a collection of Attributes.

Rough Set Theory—a theory which is concerned with classificatory analysis of imprecise, uncertain, or incomplete information or knowledge expressed in terms of data acquired from experience.

Rule Base—part of an Expert System that contains set of Fuzzy Rules.

S-OWA Operator—Simplified Ordered Weighted Averaging, in Fuzzy Logic, a family of a mean-like operators used in Integration of Fuzzy Sets.

Table—in Database, a collection of Records.

Figure 25:
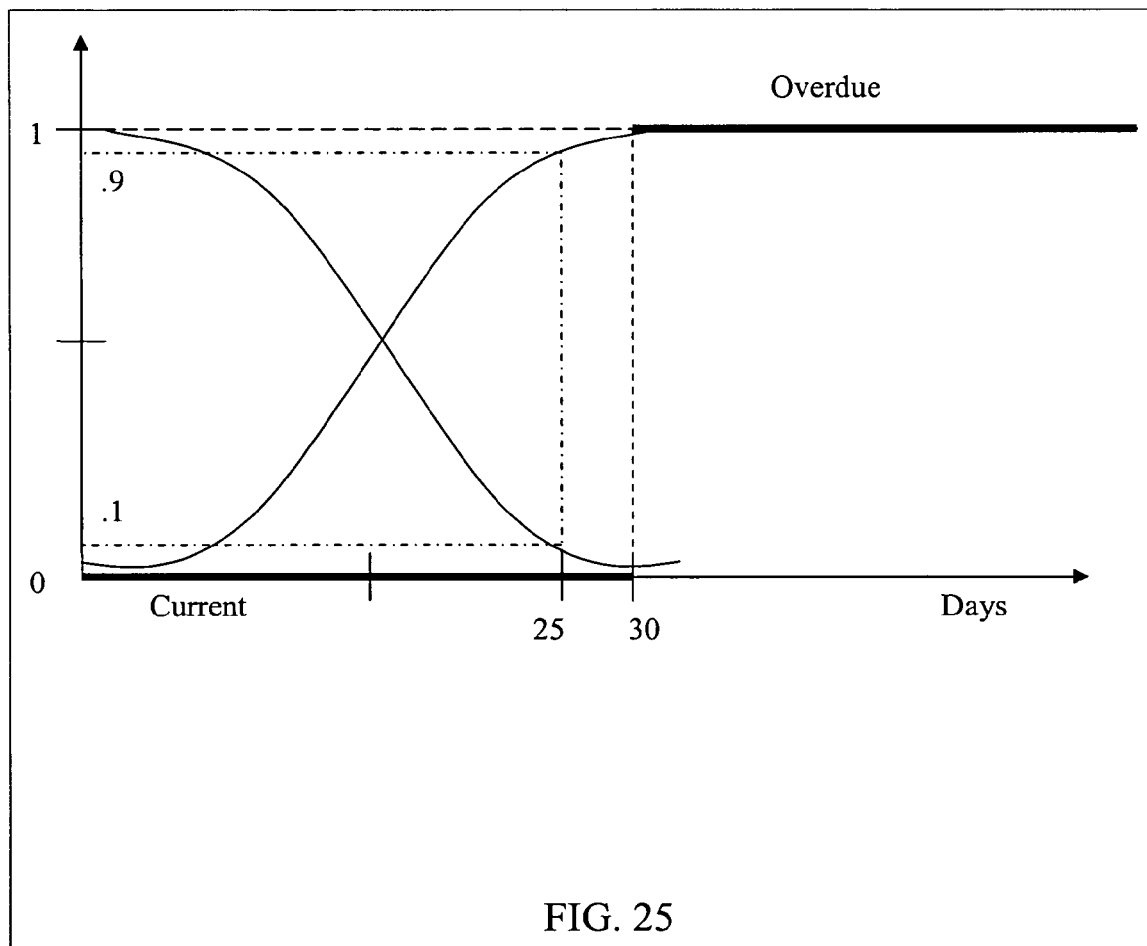
FIG. 25 illustrates a Fuzzy Logic Term set described in Glossary-of Terms.

Term Set—set of linguistic values defined on a variable's Universe Of Discourse. Term Sets define Fuzzy Logic partitioning of the input and output universes of discourse. For example, variable Profit can have different linguistic values: Low, Average, or High. See FIG. 25.

Training—in a Neural Network, a procedure whereby a network is adjusted to produce good responses to Input Data.

Threshold—in a Neural Network, a quantity added to (or subtracted from) the Weighted sum of inputs into a Neuron, which forms the Neuron's net input.

Variance—"width" of Term Set with Gaussian Membership Function.

Visualization—presenting data and summary information using Graphics, animation, 3-D displays, and other multimedia tools.

Universe Of Discourse—range of all possible values for an Input or an Output Variable.

Weight—in a Neural Network, the strength of a connection between two Neurons.

Overview

FIG. 1 is a block diagram illustrating the overall system architecture and control flow of one embodiment of the present invention. A user 102 utilizes a computer system to execute an OLAP User Interface 106. The user 102 initiates Application for Neuro-Fuzzy Expert System generation 108 which performs the descriptive (e.g. data Pattern discovery) and/or predictive (e.g. decision support) Knowledge Discovery operation of the present invention, i.e. Automatically creates Neuro-Fuzzy Expert System from the selected Cube's Dimensions and determines intrinsic Patterns of its data. In one embodiment of the present invention the data Patterns are discovered by Training the structure and parameters of the Neural Network on the Cube's data (for continuous data). In another embodiment of the present invention the data Patterns are determined by the Rough Set theory methods (for categorical data). Combination of the above techniques and other techniques are utilized in alternative embodiments of the present invention. The Application for Neuro-Fuzzy Expert System generation 108 presents to the user 102 the discovered Patterns as easily understandable logic rules and/or through data Visualization tools. In step 104, user 102 is then decides whether to continue the interactive Knowledge Discovery process or terminate it at step 110.

In one embodiment of the present invention, OLAP User Interface 106 and Application for Neuro-Fuzzy Expert System generation 108 are executed on the same computer system. In another embodiment of the present invention, OLAP User Interface 106 and Application for Neuro-Fuzzy Expert System generation 108 are executed on separate computer systems that are connected via a network. In yet another embodiment of the present invention, Application for Neuro-Fuzzy Expert System generation 108 is distributed between several computer systems connected via a network. An example network is described below.

In one embodiment of the present invention, the OLAP User Interface 106 is a Visual Basic program incorporating Microsoft Office XP Web Components accessing MSSQLServerOLAPService. One such embodiment of the OLAP User Interface 106 is shown on FIG. 2. In another embodiment of the present invention, OLAP User Interface 106 is any Application that routinely accesses OLAP Cubes (e.g. Microsoft Excel, Cognos PowerPlay, Oracle OLAP, and more).

The computer systems on which OLAP User Interface 106 and Application for Neuro-Fuzzy Expert System generation 108 are executed comprise one or more Personal Computers (PCs) (e.g., IBM and/or compatible PC workstations running the Microsoft Windows 95/98/2000/ME/CE/NT/XP operating system, Macintosh computers running the Mac OS operating system, and/or equivalent), Personal Digital Assistants (PDAs), any other computer processing devices. In another embodiment of the present invention, the computer systems on which OLAP User Interface 106 and Application for Neuro-Fuzzy Expert System generation 108 are executed are one or more server systems (e.g., SUN Ultra workstations running the SunOS or AIX operating system or IBM RS/6000 workstations and servers running the AIX operating system).

In an alternate embodiment of the present invention, FIG. 1 includes a network for connecting OLAP User Interface 106 and Application for Neuro-Fuzzy Expert System generation 108. The network is a circuit switched network, such as the Public Service Telephone Network (PSTN). In another embodiment of the present invention, the network is a packet switched network. The packet switched network is a wide area network (WAN), such as the global Internet, a private WAN, a local area network (LAN), a telecommunications network or any combination of the above-mentioned networks. The network is a wired network, a wireless network, a broadcast network or a point-to-point network.

Architecture of the Application for Neuro-Fuzzy Expert System Generation

Figure 3:
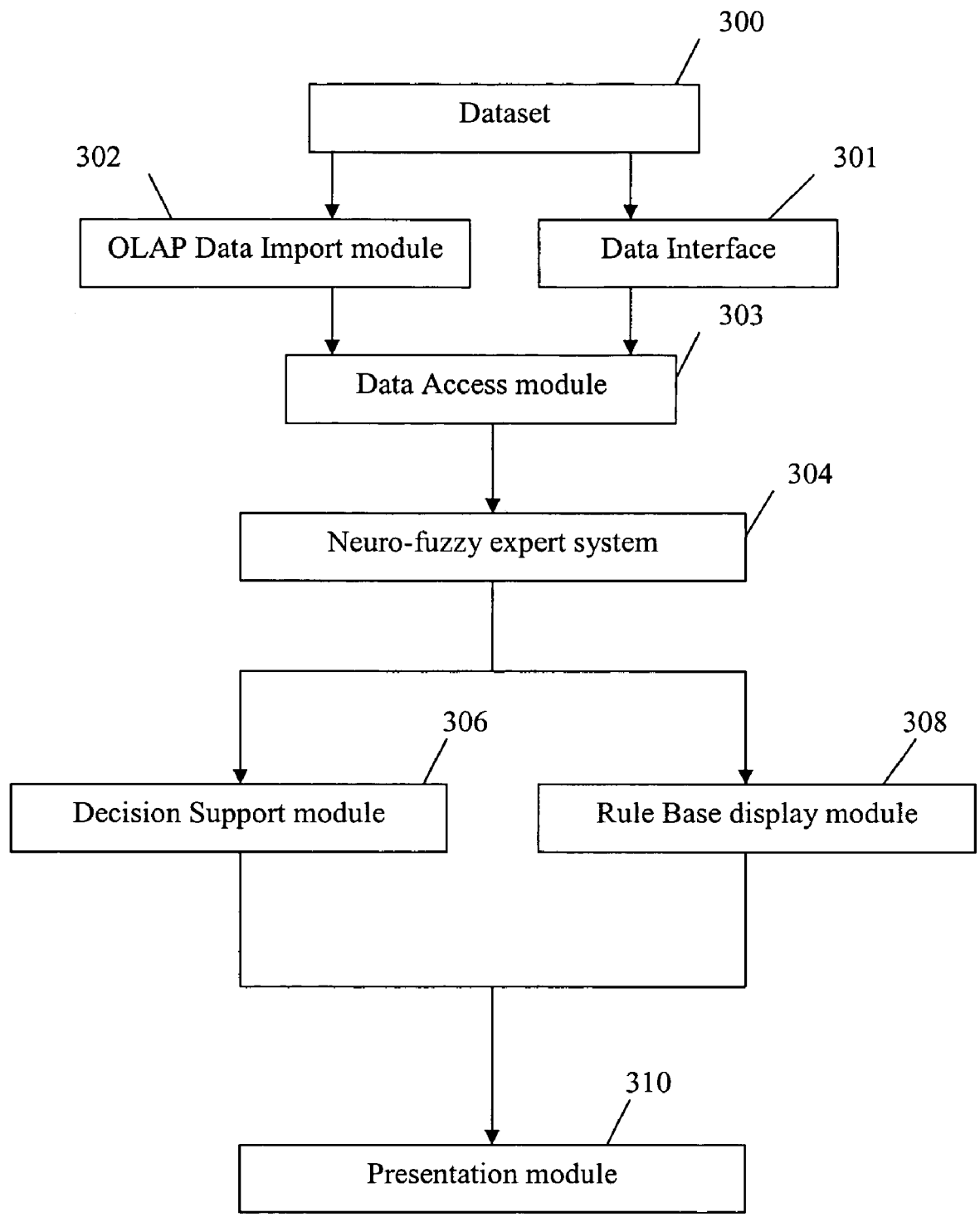
FIG. 3 is a block diagram illustrating architecture and control flow of one embodiment of the Application for Neuro-Fuzzy Expert System generation 108 of FIG. 1.

FIG. 3 is a block diagram illustrating architecture and control flow of one embodiment of the Application for Neuro-Fuzzy Expert System generation 108 of FIG. 1, according to the present invention. FIG. 3 describes in more detail Application 108 of FIG. 1.

Figure 4:
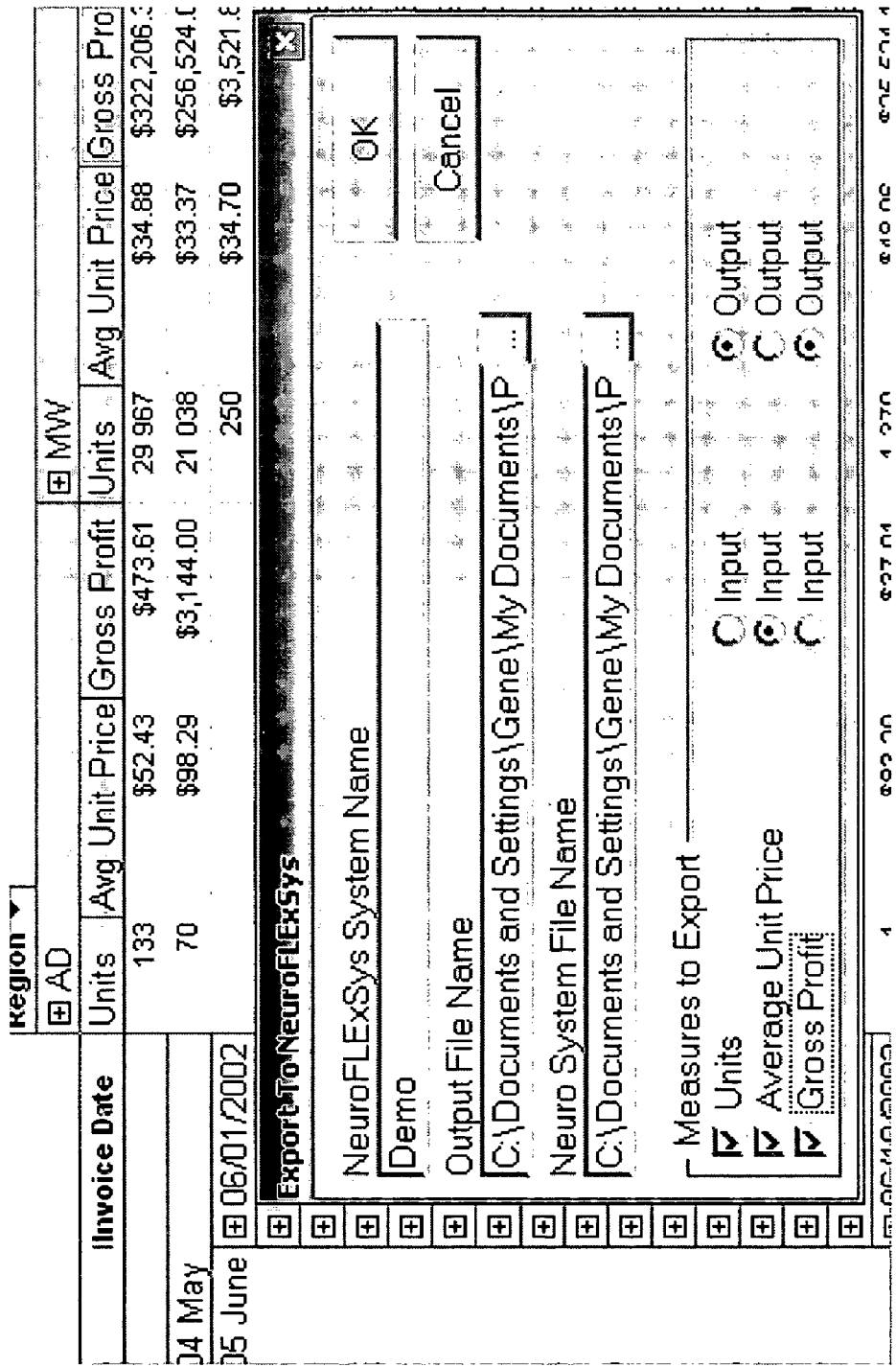
FIG. 4 is a screenshot of one embodiment of a GUI of the Neuro-Fuzzy Expert System generating Application's Data Import module 302 of FIG. 3, utilized to import data from an OLAP Cube.

Neuro-Fuzzy Expert System generation by Dataset 300 starts in OLAP Data Import module 302. One embodiment of the GUI utilized to import data from an OLAP Cube is shown on FIG. 4.

Figure 5:
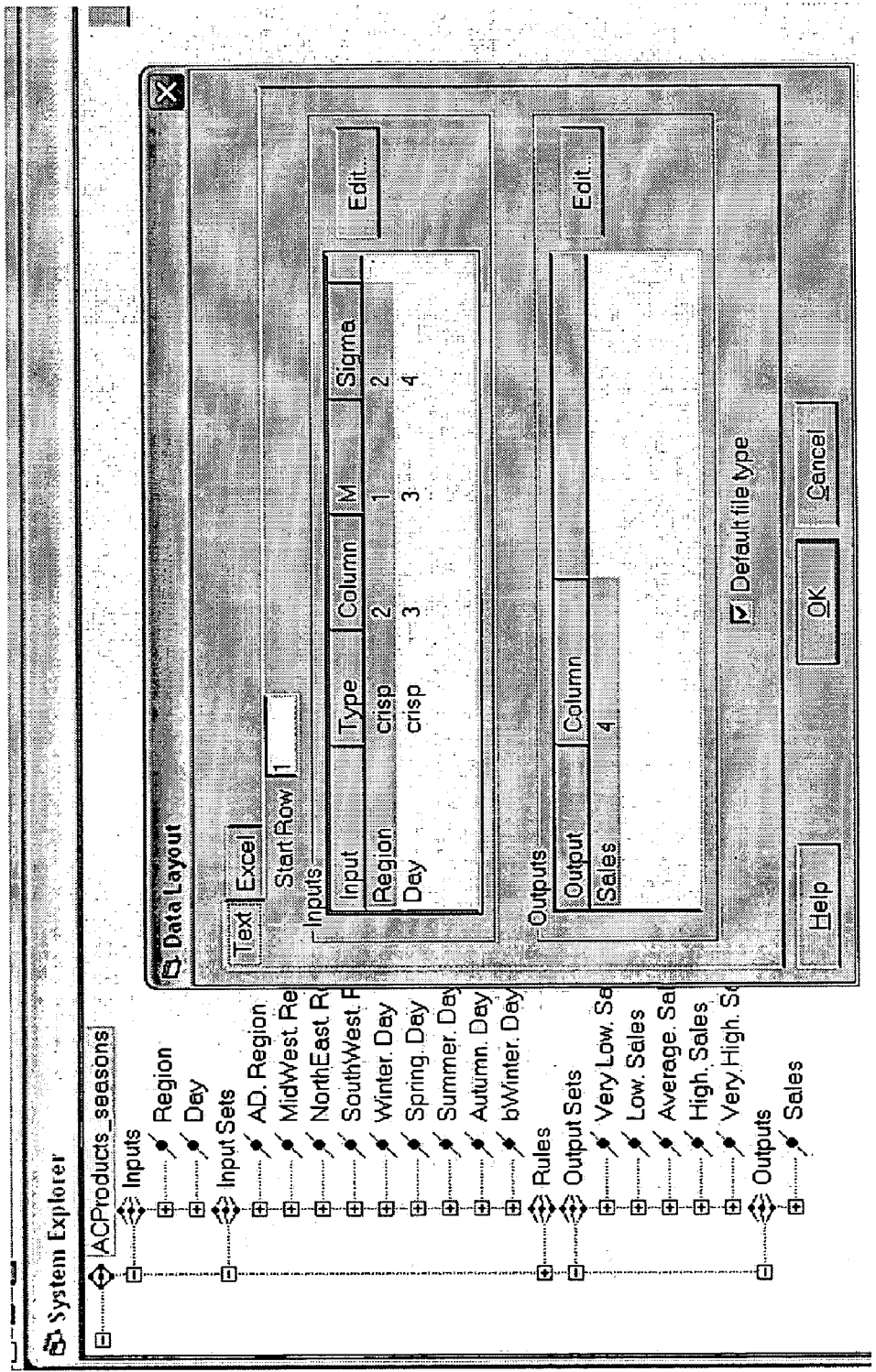
FIG. 5 is a screenshot of one embodiment of a GUI of the Application for Neuro-Fuzzy Expert System generation showing Data type and layout setup of the Data Interface 301 of FIG. 3.

In another embodiment of the Application for Neuro-Fuzzy Expert System generation the Dataset 300 is directly imported from an OLAP Cube, relational Database, text file, spreadsheet and/or another structured data source. It is imported into the Application for Neuro-Fuzzy Expert System generation through the Data Access module 303 according to the settings in the Data Interface 301. One embodiment of the GUI showing the Data file type setup used in the Data Interface 301 is depicted on FIG. 5.

The Dataset 300 is passed to the Neuro-Fuzzy Expert System 304 described in more details on FIG. 6 below. In a Descriptive Operation (e.g. Pattern discovery described in more detail on FIG. 7 below) Neuro-Fuzzy Expert System is Automatically generated from the Training Dataset. In a Predictive Operation (e.g. sales Forecast, Pattern recognition) a previously created Neuro-Fuzzy Expert System is utilized to deduce an output value of a target variable (e.g. weekly sales) based on the input values (e.g. season) read from the input Dataset. One of the Predictive Operations, decision support, is described on FIG. 8 below.

Control is then passed to either Decision Support module 306 (Predictive Operation) or to the Rule Base display module 308 (Descriptive Operation).

Figure 9:
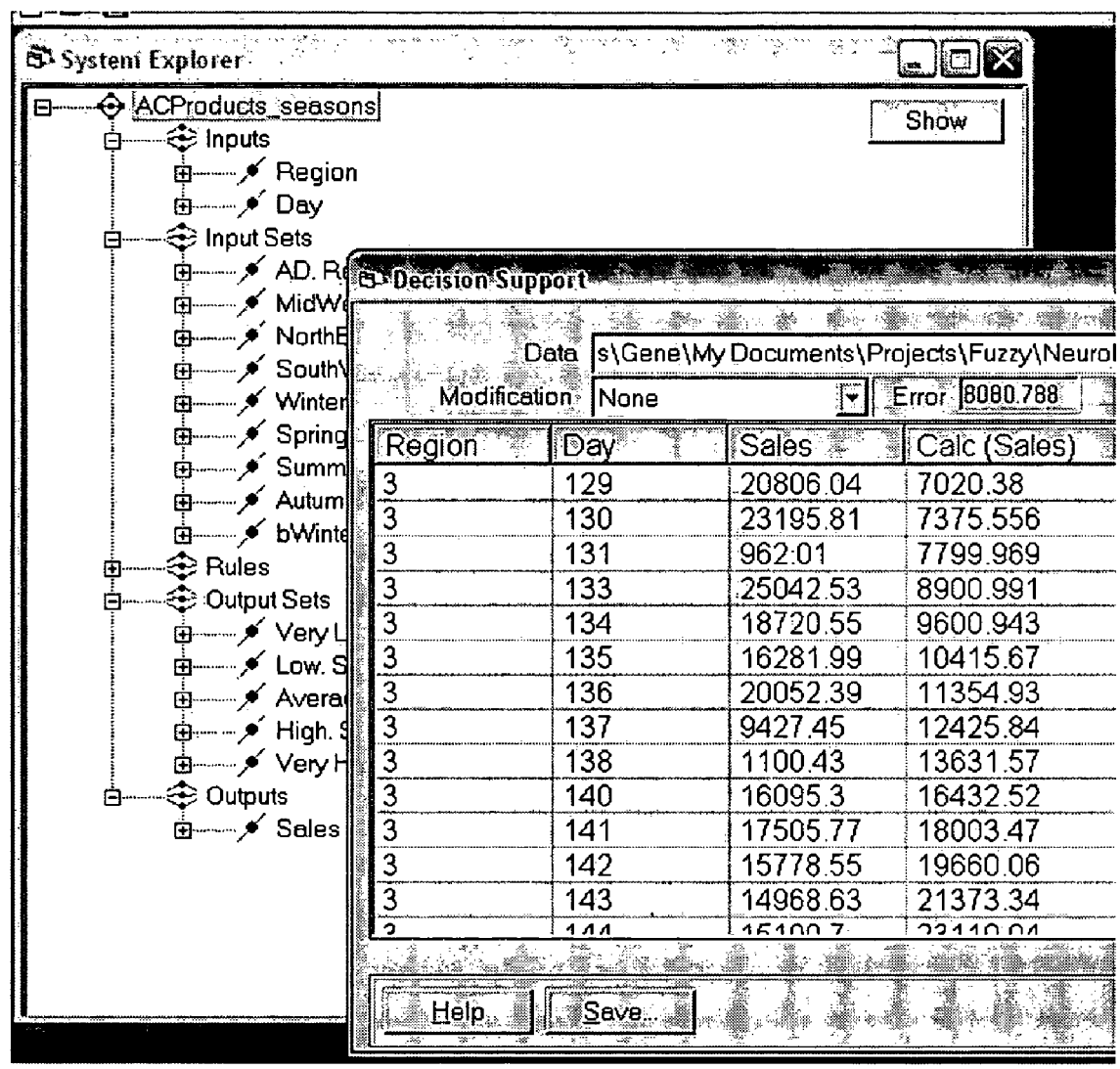
FIG. 9 is a screenshot of one embodiment of a GUI of the Application for Neuro-Fuzzy Expert System generation showing decision support table produced by the operation described on FIG. 8.

The Decision Support module 306 displays predicted output values of the target variable. One embodiment of the GUI showing the decision support table is depicted on FIG. 9.

Figure 10:
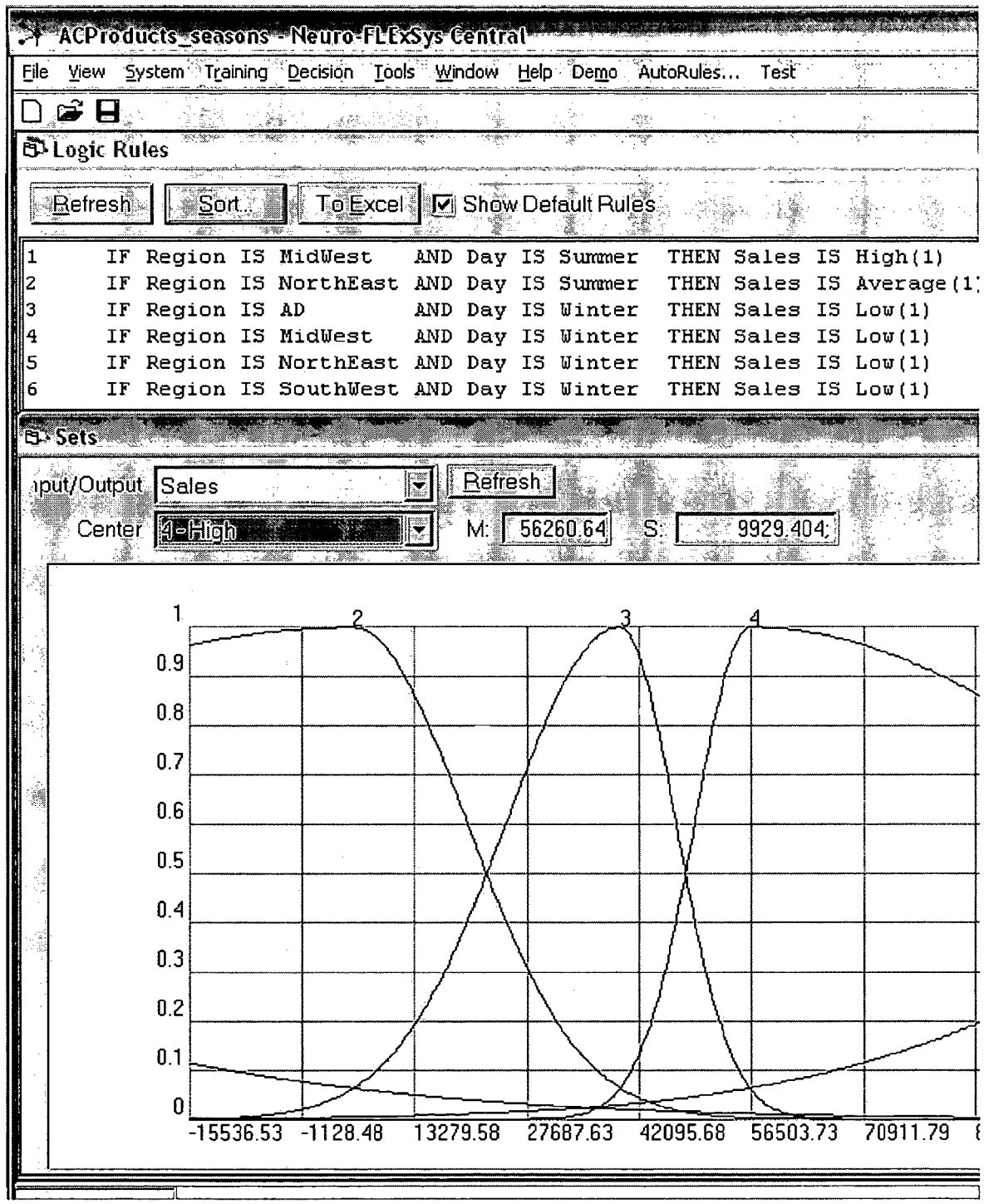
FIG. 10 is a screenshot of one embodiment of a GUI of the Application for Neuro-Fuzzy Expert System generation 108 of FIG. 1 showing Fuzzy Logic Membership Functions, Rule Base, and Term Set parameters.

The Rule Base display module 308 presents newly discovered knowledge in the form of Fuzzy Rules and Term Sets' parameters. One embodiment of the GUI showing Fuzzy Logic Membership Functions, Rule Base and Term Set's parameters is depicted on FIG. 10. In that example, one of the Fuzzy Rules reads: IF Region IS Midwest and Day IS Summer THEN Sales is High (1). Where the Term Set High of the Output Variable Sales is defined as Gaussian shaped Membership Function with Expectation of $56,260.64 and one of the two Variances equal to $9,929.04. Link Weight of 1 in this example indicates that Midwest produces High Sales in Summer 100% of the time.

Results from both Descriptive and Predictive Knowledge Discovery operations can be further illustrated by Presentation module 310 utilizing various interactive data Visualization techniques.

Figure 6:
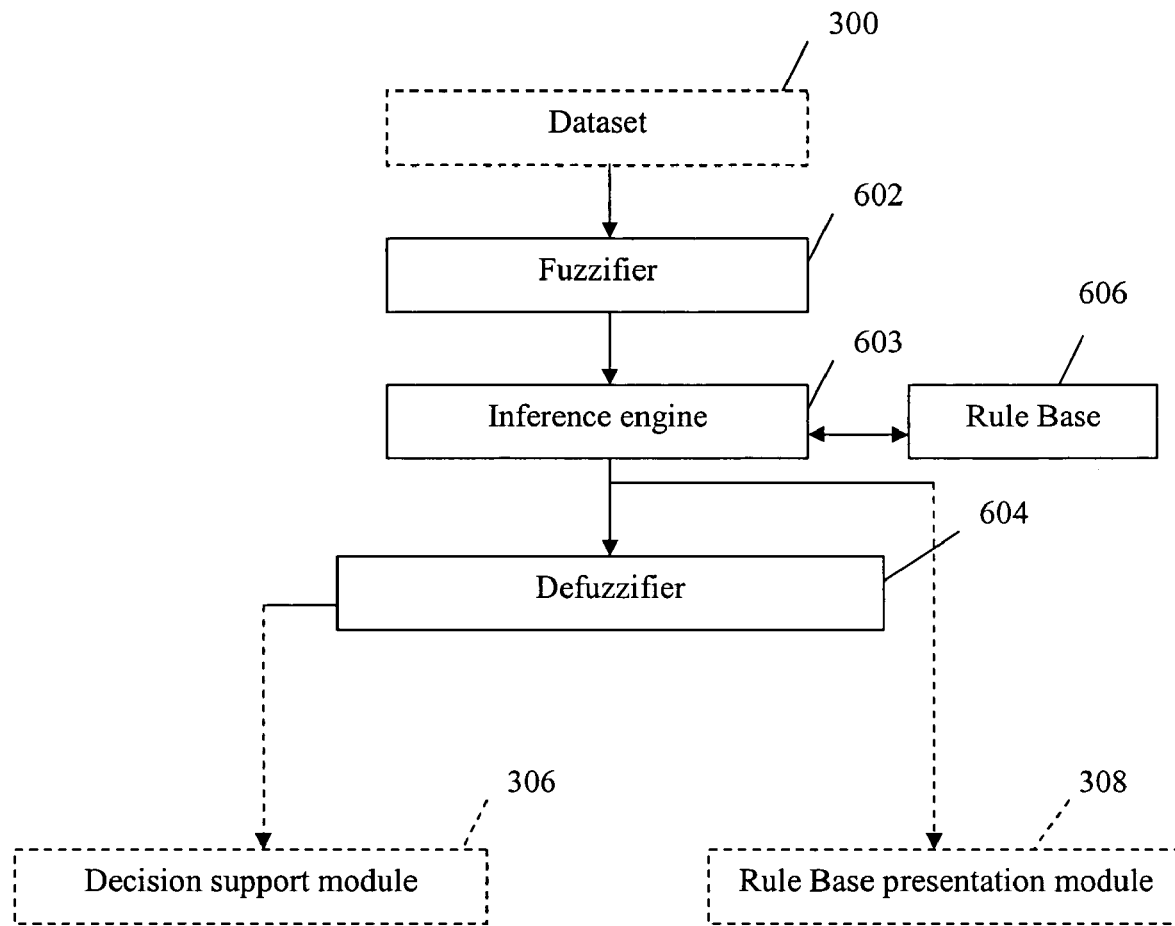
FIG. 6 is a block diagram illustrating architecture and data flow of the typical Fuzzy Logic Expert System, module 304 of FIG. 3.

FIG. 6 is a block diagram illustrating architecture and data flow of the typical Fuzzy Logic Expert System 304 of FIG. 3. FIG. 6, blocks 602 through 606 show in more detail module 304 of FIG. 3.

In step 602, input from Dataset 300 is fuzzified: Attribute values are converted into input Term Sets and Membership values. For example, input value of 25 days for VoucherAge Attribute is converted to input Term Set "Current" with Membership 0.1 and input Term Set "Overdue" with Membership 0.9.

Next, Inference Engine 603 utilizing Rule Base 606 deduces output Term Sets. For example, triggered Fuzzy Rules may read: "IF VoucherAge is Current AND Discount IS High THEN PayDate IS Later" and "IF VoucherAge is Overdue AND Discount IS High THEN PayDate IS Soon". Thus output Term Sets will be "Later" and "Soon".

In the Descriptive Operation, the rules are presented to the User 102 through the Rule Base presentation module 308 as Patterns discovered in the Dataset 300.

In the Predictive Operation, the output Term Sets and their Membership values are passed to the Defuzzifier 604 which produces a Crisp Output for "Pay Date" equal to "in 2 days". The output is passed to the Decision Support module 306 to be reviewed by the User 102.

Figure 11:
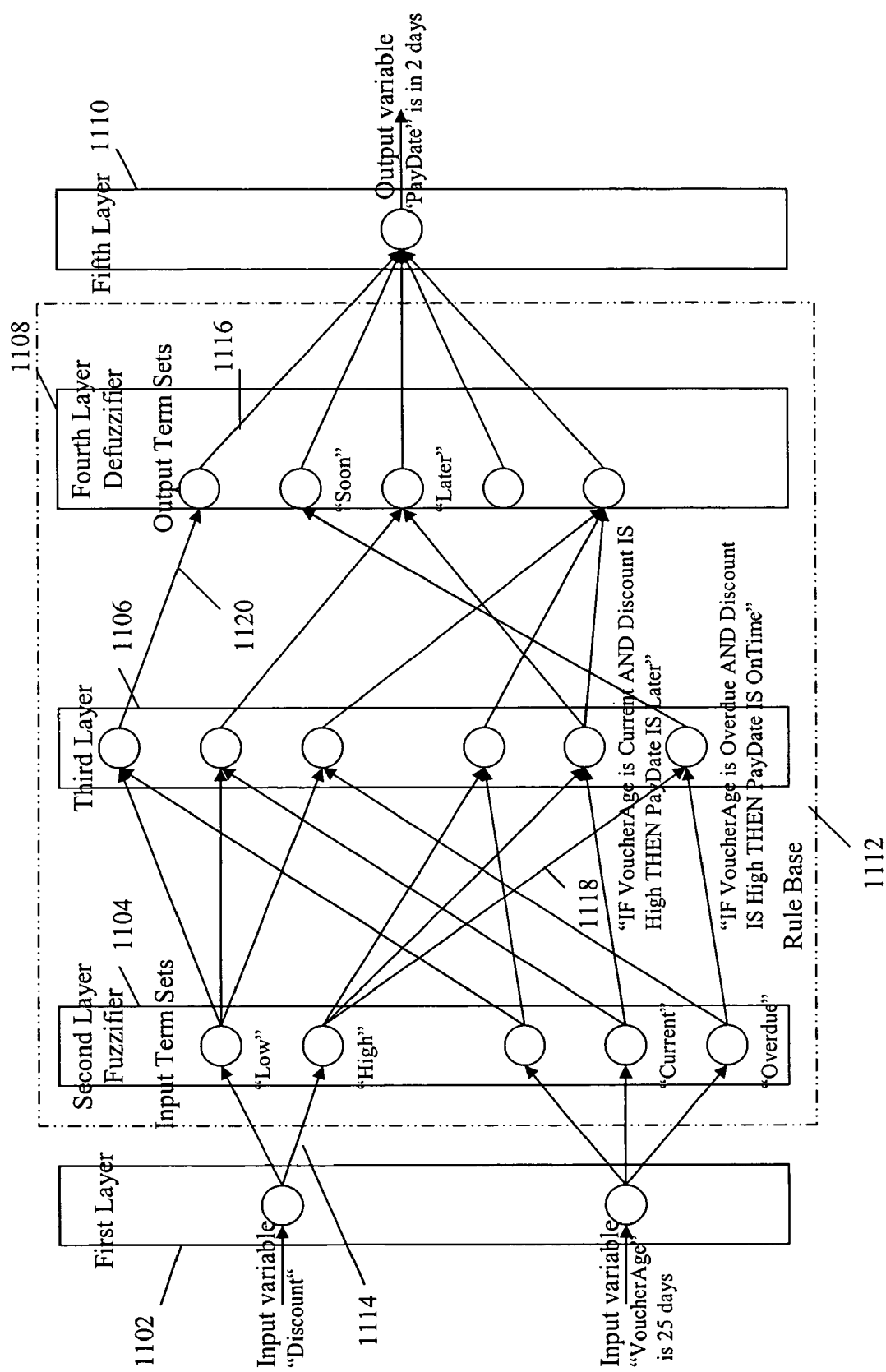
FIG. 11 depicts one embodiment of the Neural Network structure of Neuro-Fuzzy Expert System module 304 of FIG. 3.

Application for Neuro-Fuzzy Expert System generation produces Fuzzy Logic Expert System implemented as a Neural Network. One embodiment of-the Neural Network structure is depicted on FIG. 11. FIG. 11 shows in more detail module 304 of FIG. 3. In one embodiment of the Application for Neuro-Fuzzy Expert System generation, its Neural Network is comprised of five Layers (C. T. Lin and C. S. George Lee, "Supervised and unsupervised learning with fuzzy similarity for Neural Network-based Fuzzy Logic control systems," in Fuzzy Sets, Neural Networks, and Soft Computing, R. Yager and L. A. Zadeh (eds), Thomson Learning, 1994, pp. 85-125, which is hereby incorporated by reference in its entirety). In another embodiment of the Application for Neuro-Fuzzy Expert System generation, one more Layer is added to its Neural Network to implement tuning of the Defuzzification parameters described on FIG. 12, step 1214 below. Layers and Links of the Neural Network depicted on FIG. 11 are described in more detail in the "Generation of the Neuro-Fuzzy Expert System" section below.

Operation Of Pattern Discovery In OLAP Cube

Figure 7:
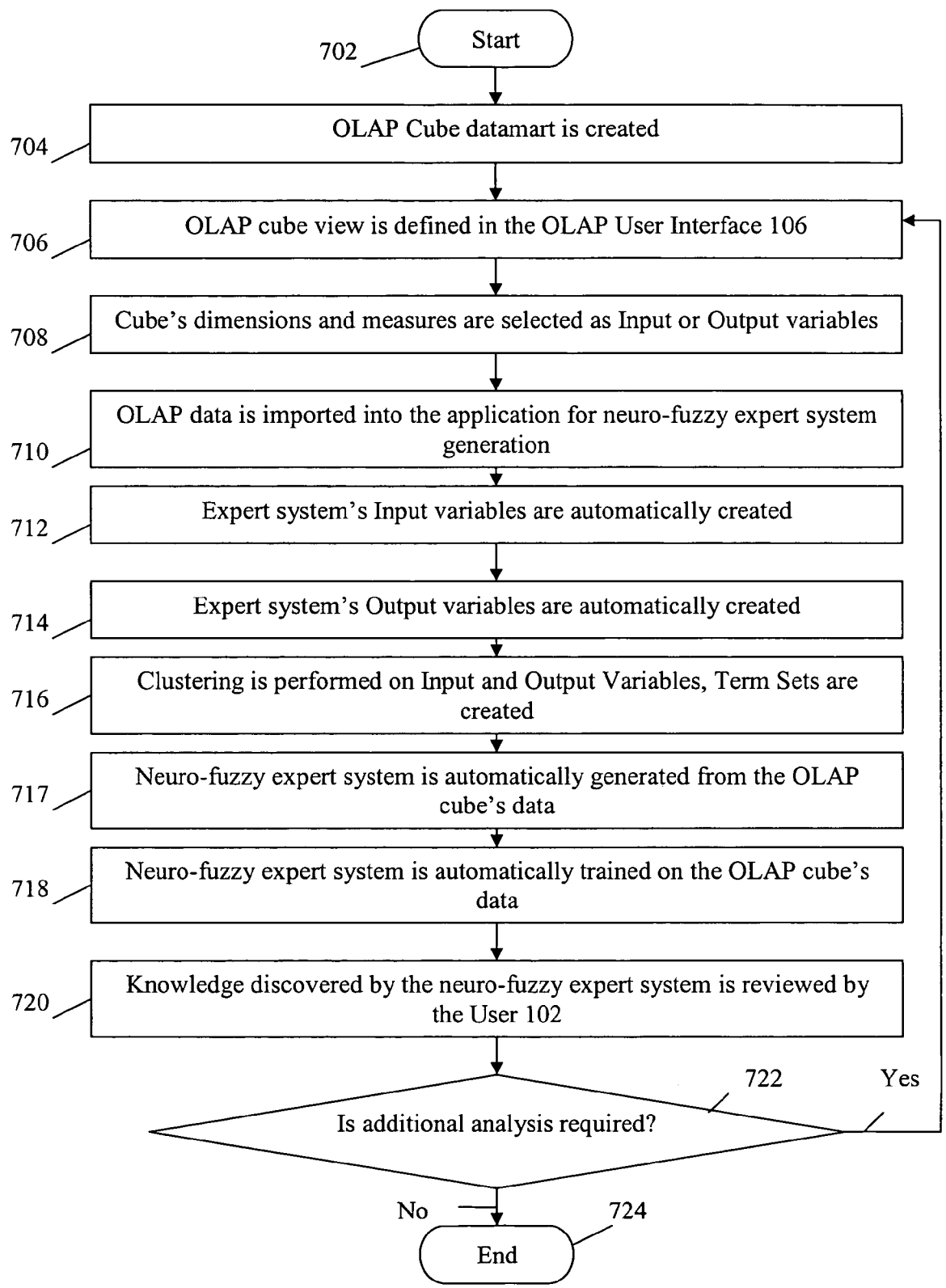
FIG. 7 is a flowchart depicting the operation and control flow of the automatic generation of the Neuro-Fuzzy Expert System module 304 of FIG. 3. The flowchart also shows data Patterns discovery operation by the Application for Neuro-Fuzzy Expert System generation.

FIG. 7 is a flowchart describing the operation and control flow of a Descriptive Operation by one embodiment of the Application for Neuro-Fuzzy Expert System generation 108, namely data Patterns discovery in an OLAP Cube (steps 708 through 720). Another embodiment of the data driven Application for Neuro-Fuzzy Expert System generation can be utilized for Pattern discovery in a relational Database, spreadsheet, text file, and/or in any other type of structured data.

The control flow of FIG. 7 begins with step 702 and goes directly to step 704.

In step 704, Data Mining objectives are determined from a business perspective. OLAP Cube Dimensions and Measures are defined. OLAP Cube datamart is designed and implemented utilizing one of the OLAP Applications such as Microsoft Analysis Manager, Microsoft Excel, Cognos, Oracle OLAP, and others. Data is collected, described, validated, constructed, integrated, formatted, and cleaned (see CRISP-DM Data Mining process description at www.crisp-dm.org). Data is imported into the OLAP Cube datamart. Following is an example of a coma separated data Record before it is imported into the OLAP Cube:

4327886,"3-315584",1,"03/12/03",2004,1,"2004-02", "March",3,"3-W. BRIDGEWATER-MA","FG03D","Blazer & Jimmy 92-94","PRE",24,"SENDING UNITS","UNDERCARRIAGE PARTS",9353,"31SULTI-SULLIVAN TIRE", "AR","AUTO REPAIR","INSTALLER","BOSTON DIVISION","MA","NORWELL","NE","STEVE WILLIAMS", "INV",1,75.18,31.01,75.18,31.01,44.17,0.5875,"31-BRAINTREE-MA", "USA","NA"

In step 706, user 102 defines Cube data view through the OLAP User Interface 106. User 102 specifies row and column Dimensions, sets Filters, and selects Measures to be present in the view.

In step 708 operation of data Patterns discovery in the OLAP Cube begins. In this step, user 102 selects in OLAP Data Import module 302 Cube's Dimensions and Measures to be used as Input or Output Variables of the Descriptive Operation. User 102 initiates the import process described in step 710 below. One embodiment of the GUI utilized in this step is shown on FIG. 4.

In step 710, entire Dataset present in the view defined in step 706 together with labels for its Dimensions and Measures is Automatically extracted from the OLAP Cube and imported into the Application for Neuro-Fuzzy Expert System generation. In one embodiment of the Application for Neuro-Fuzzy Expert System generation coma delimited text file is used as an intermediary format of the import procedure. Each Attribute of the comma delimited file's Record corresponds to one of the Dimensions or Measures selected in step 708. Following is an example of the intermediary coma delimited data Record imported from the OLAP Cube:

1, 4, 6, 3.924

In another embodiment of the Application for Neuro-Fuzzy Expert System generation, the Dataset is read directly from the OLAP Cube.

Figure 13:
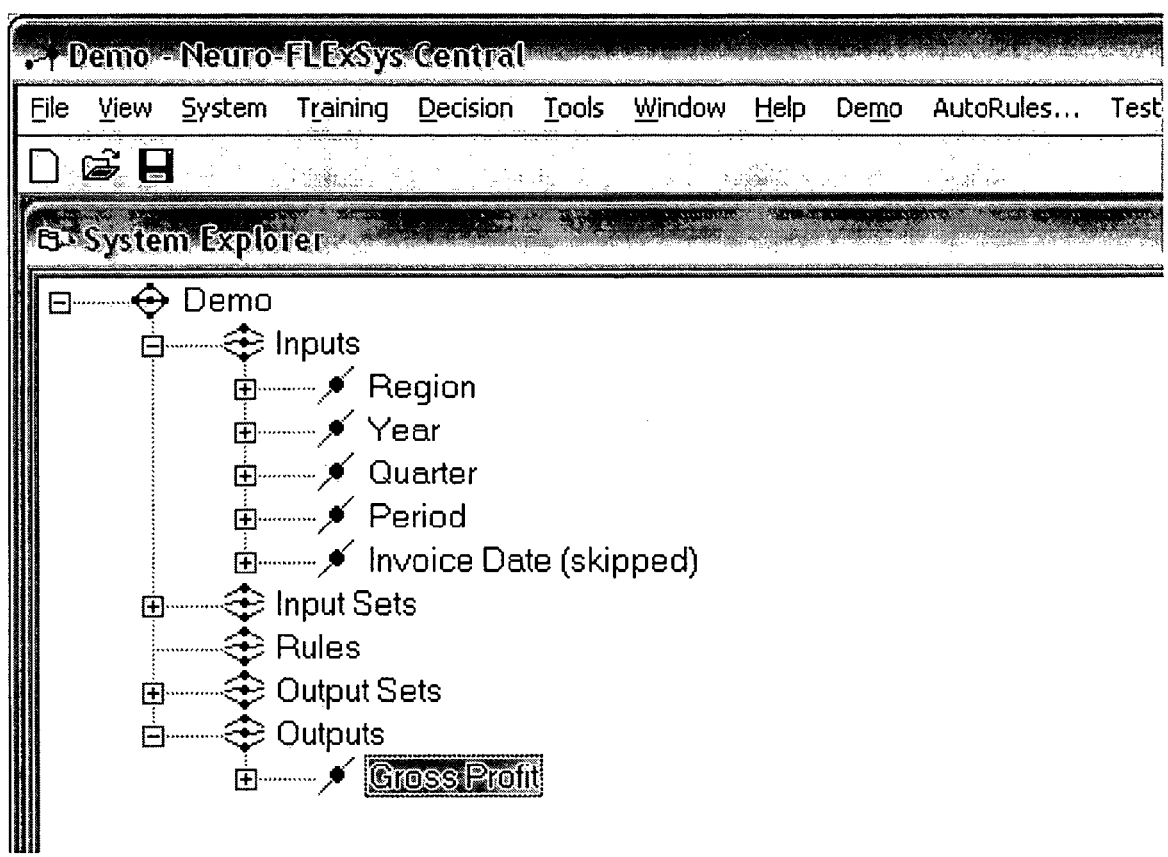
FIG. 13 is a screenshot of one embodiment of a GUI of the Application for Neuro-Fuzzy Expert System generation showing Input and Output Variables Automatically created in steps 712 and 714 of FIG. 7.

In step 712, Input Variables of the Neuro-Fuzzy Expert System 304 are Automatically created for each Dimension and Measure selected as input in step 708. Each Input Variable corresponds to one Attribute in the Dataset imported in step 710. One embodiment of the GUI showing Input Variables Automatically created in step 712 is depicted on FIG. 13.

In step 714, Output Variables of the Neuro-Fuzzy Expert System 304 are Automatically created for each Dimension and Measure selected as output in step 708. Each Output Variable corresponds to one Attribute in the Dataset imported in step 710. One embodiment of the GUI showing Output Variables Automatically created in step 712 is depicted on FIG. 13.

Figure 14:
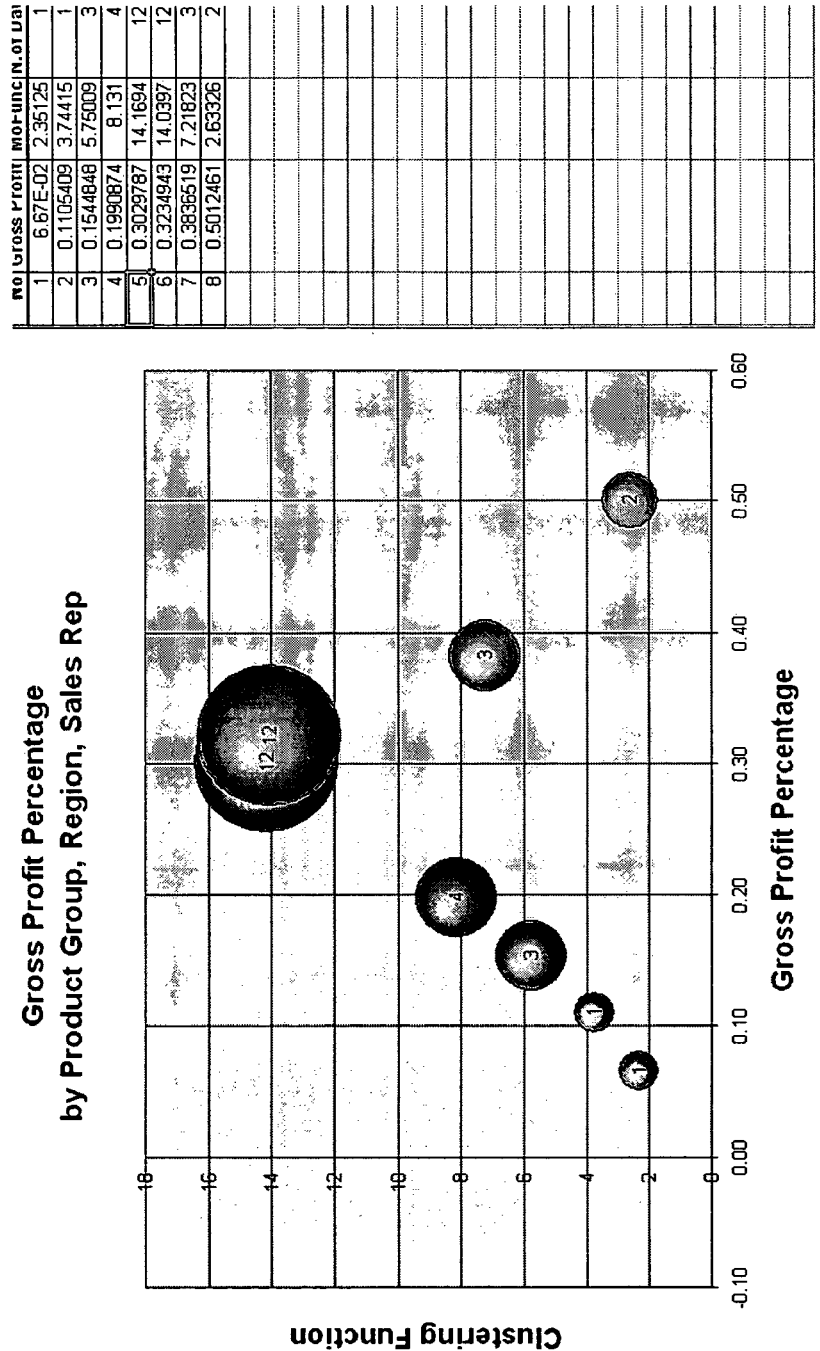
FIG. 14 depicts one version of cluster Bubble Chart produced in step 716 of FIG. 7.
Figure 15:
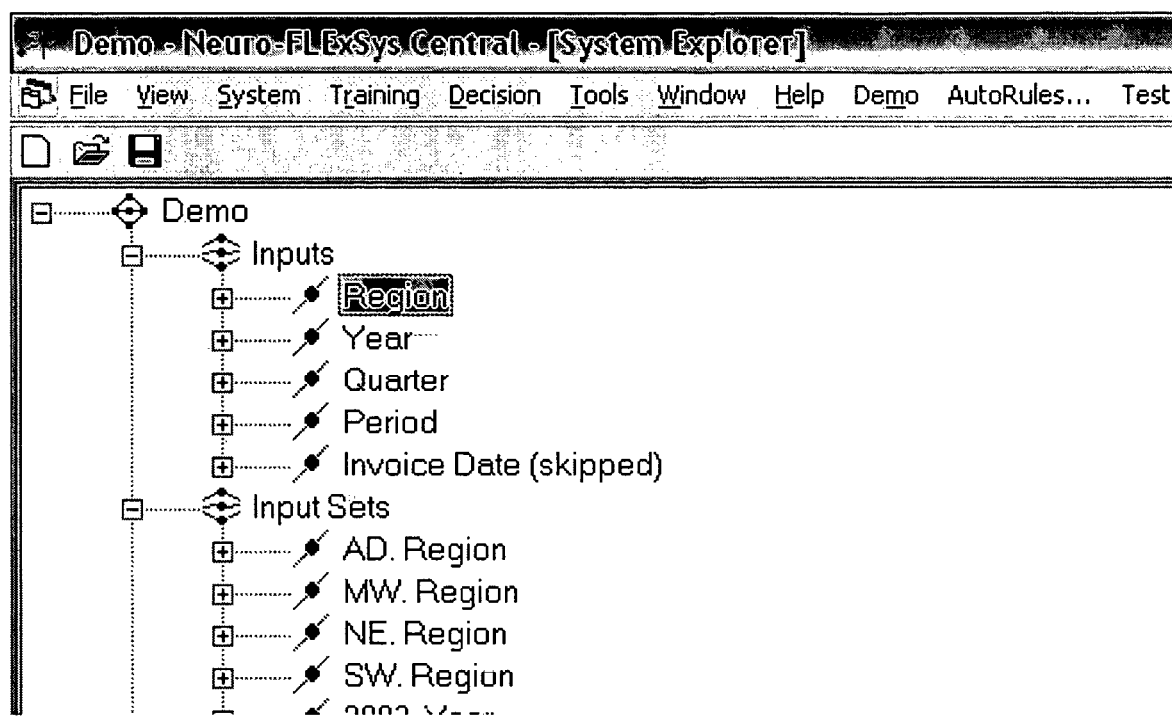
FIG. 15 is a screenshot of one embodiment of a GUI of the Application for Neuro-Fuzzy Expert System generation showing input Term Sets Automatically created in step 716 of FIG. 7.
Figure 16:
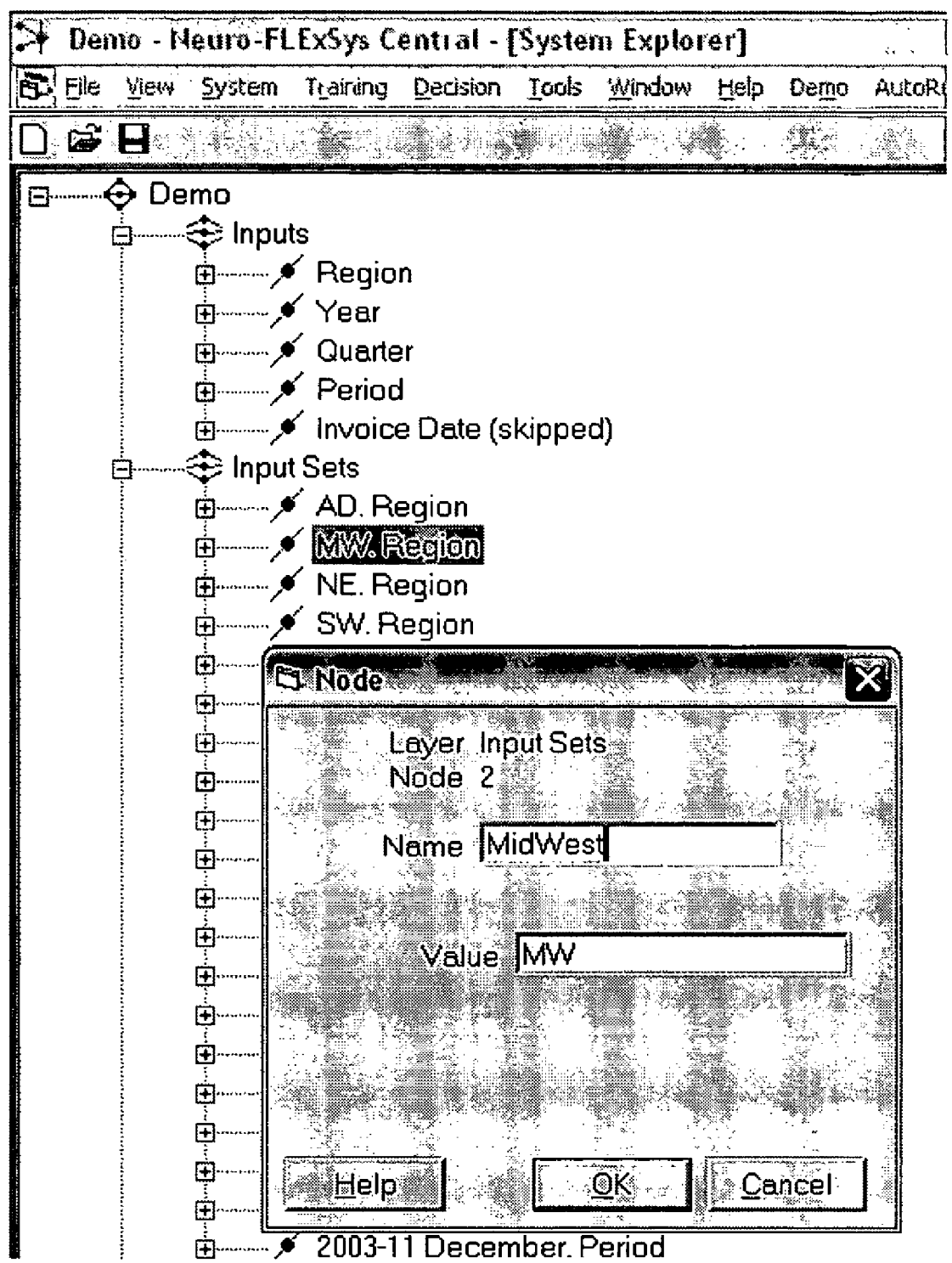
FIG. 16 is a screenshot of one embodiment of a GUI of the Application for Neuro-Fuzzy Expert System generation for manual editing of Term Sets' descriptions. The Term Sets are Automatically created in step 716 of FIG. 7.

In step 716, automatic Clustering is performed separately for each Input and Output Variable's single-Attribute Datasets. In one embodiment of the Application for Neuro-Fuzzy Expert System generation, continuous data is clustered by Autonomous Mountain Clustering method (P. J. Costa Branco and N. Lori, "Autonomous mountain-Clustering method applied to fuzzy systems modeling," in Smart Engineering Systems: Fuzzy Logic and Evolutionary Programming, ASME Press: New York, 1995, pp. 311-316, which is hereby incorporated by reference in its entirety) and optimal parameters for the Clustering method are Automatically selected by Genetic Algorithm seeking to minimize a Cluster Validity Index. Bubble charts which illustrate the clusters are also created in this step. One version of such cluster illustrative Bubble Chart is shown on FIG. 14. An Input/Output Variable Term Set is assigned to each cluster (e.g. High Sales). In case of categorical data a Term Set is assigned for each category. One embodiment of the GUI showing Input Variable's Term Sets Automatically created in this step is depicted on FIG. 15. In one embodiment of the Application for Neuro-Fuzzy Expert System generation, Term Sets' descriptions can be modified Manually to enhance understandability of the Expert System's Rule Base described in step 720 below. One embodiment of the GUI for editing Term Sets is depicted on FIG. 16. Fuzzy Logic Membership Function is Automatically defined on each Term Set based on the parameters of its corresponding cluster. Gaussian Membership Functions with two different Variances were used in one embodiment of the Application for Neuro-Fuzzy Expert System generation. One embodiment of the GUI to display the Membership Functions is depicted on FIG. 10. The Term Sets and their Membership Functions are used in the step 717 described below.

In step 717, an initial Neural Network structure is generated based on the Clustering performed in step 716. The Neural Network is a foundation of the Neuro-Fuzzy Expert System 304 of the Application for Neuro-Fuzzy Expert System generation. One embodiment of the Neuro-Fuzzy Expert System generating Application's Neural Network structure is depicted on FIG. 11. The initial Neural Network's structure generation process is described on FIG. 18 below.

Figure 19:
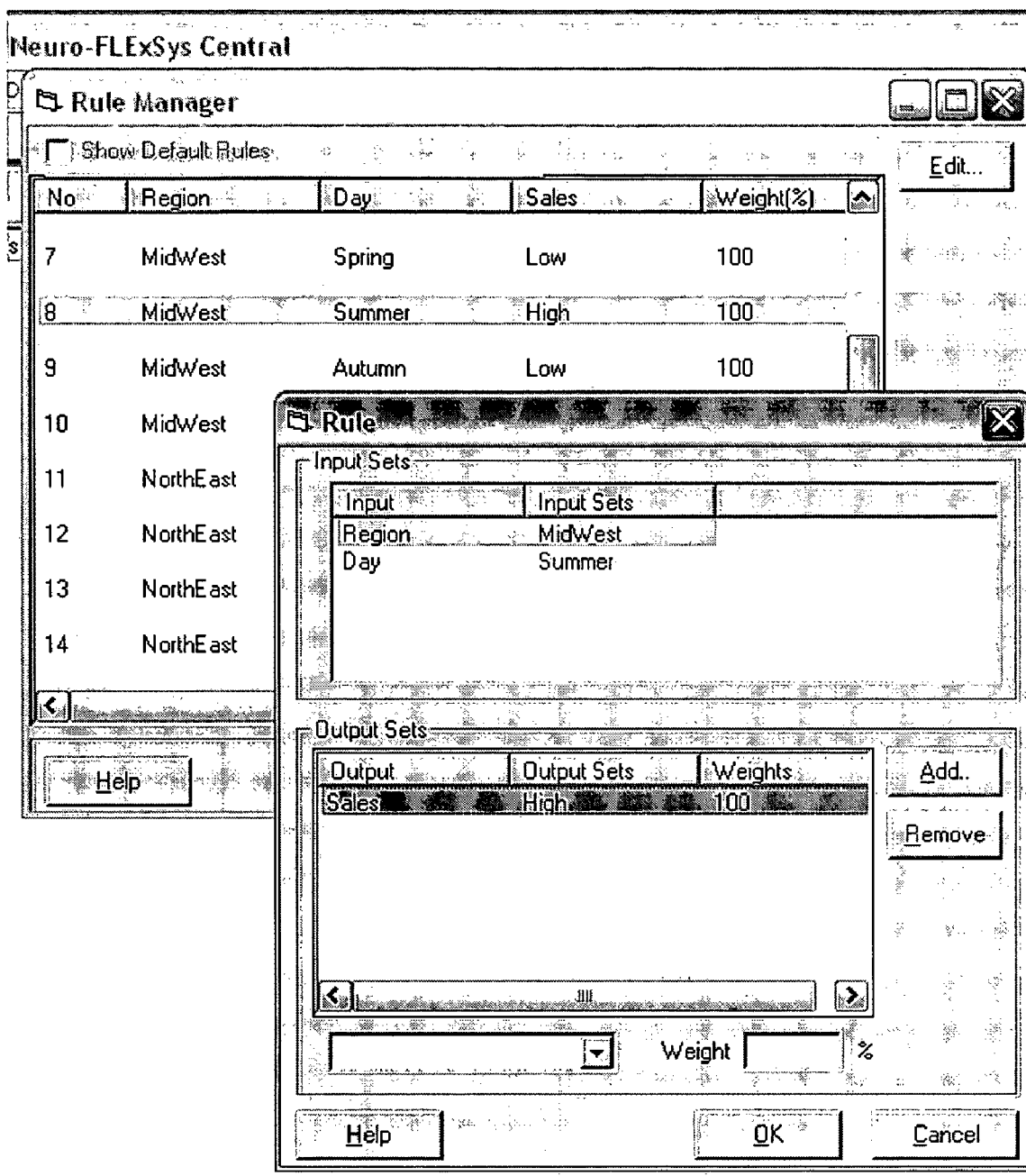
FIG. 19 is a screenshot of one embodiment of a GUI of the Application for Neuro-Fuzzy Expert System generation for manual editing of Rule Base generated by the process described on FIG. 7.

In step 718, Neuro-Fuzzy Expert System 304 is Automatically trained on the OLAP Cube's Dataset imported in step 710. The process is described in more details on FIG. 12 below. In one embodiment of the Application for Neuro-Fuzzy Expert System generation, the Expert System's structure and parameters are determined by Training its underlying Neural Network on the imported Dataset. In another embodiment of the Application for Neuro-Fuzzy Expert System generation, the Neural Network's structure and parameters are entered and/or modified Manually allowing fusion of human expert's knowledge with the Automatically created Rule Base. One embodiment of a GUI of the Application for Neuro-Fuzzy Expert System generation for manual editing of Rule Base is depicted on FIG. 19. Imported Dataset's intrinsic Patterns become embedded in the resulting Neural Network's structure and parameters. The Neural Network's structure is represented by the Expert System's Rule Base 606. The Neural Network's parameters are represented by the Expert System's Term Sets characteristics and Link Weights.

Figure 17:
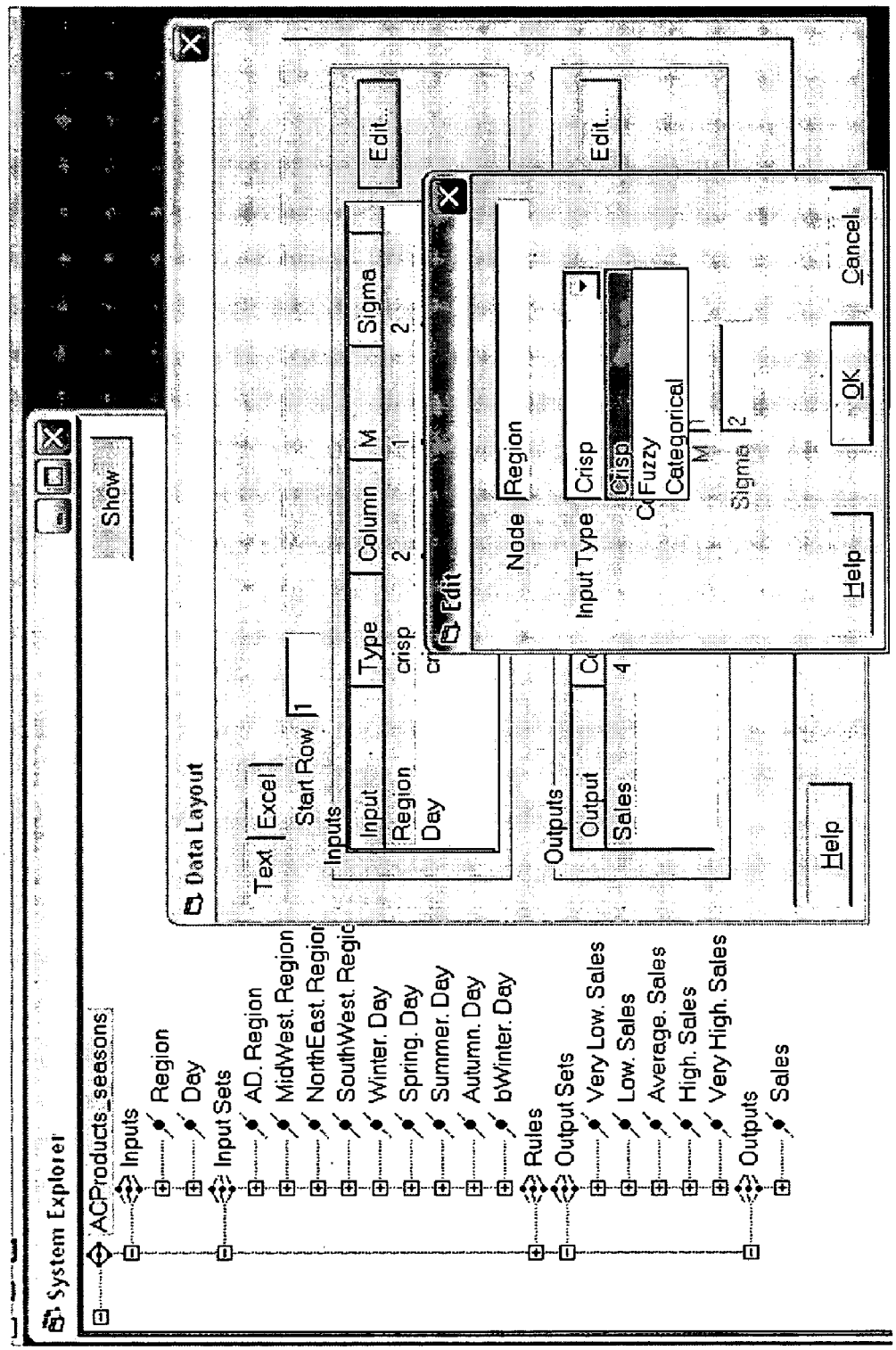
FIG. 17 is a screenshot of one embodiment of a GUI of the Application for Neuro-Fuzzy Expert System generation showing the entire expert system for all the inputs, the input sets, all the outputs and output sets.

In step 720, newly discovered Patterns are presented to the User 102 through the content of the Rule Base 606, Term Sets' parameters (Expectation and Variances), and Link Weights. For example, Expert System's Fuzzy Rule may read: IF Region IS Midwest AND Day IS Summer THEN Sales IS High (0.75). High Sales Term Set may be represented by a Gaussian Membership Function with Expectation at $56,000 and Variance of $9,900. Link Weight of 0.75 indicates that 75 percent of High Sales come from Midwest in Summer. The Rule Base content presentation is enhanced by sort functionality. One embodiment of the GUI showing the Rule Base 606 and Term Set's parameters is depicted on FIG. 10. A screenshot of one embodiment of a GUI of the showing the entire expert system for all the inputs, the input sets, all the outputs and output sets in FIG. 17.

In one embodiment of the Application for Neuro-Fuzzy Expert System generation, the Rule Base is represented by a Graphical model of its underlying Neural Network.

In step 722, User 102 decides whether an additional Data Analysis is required. If yes, then control is transferred back to the new OLAP Cube view definition in step 706, otherwise the process of data Patterns discovery in OLAP is terminated at step 724.

Decision Support Operation

Figure 8:
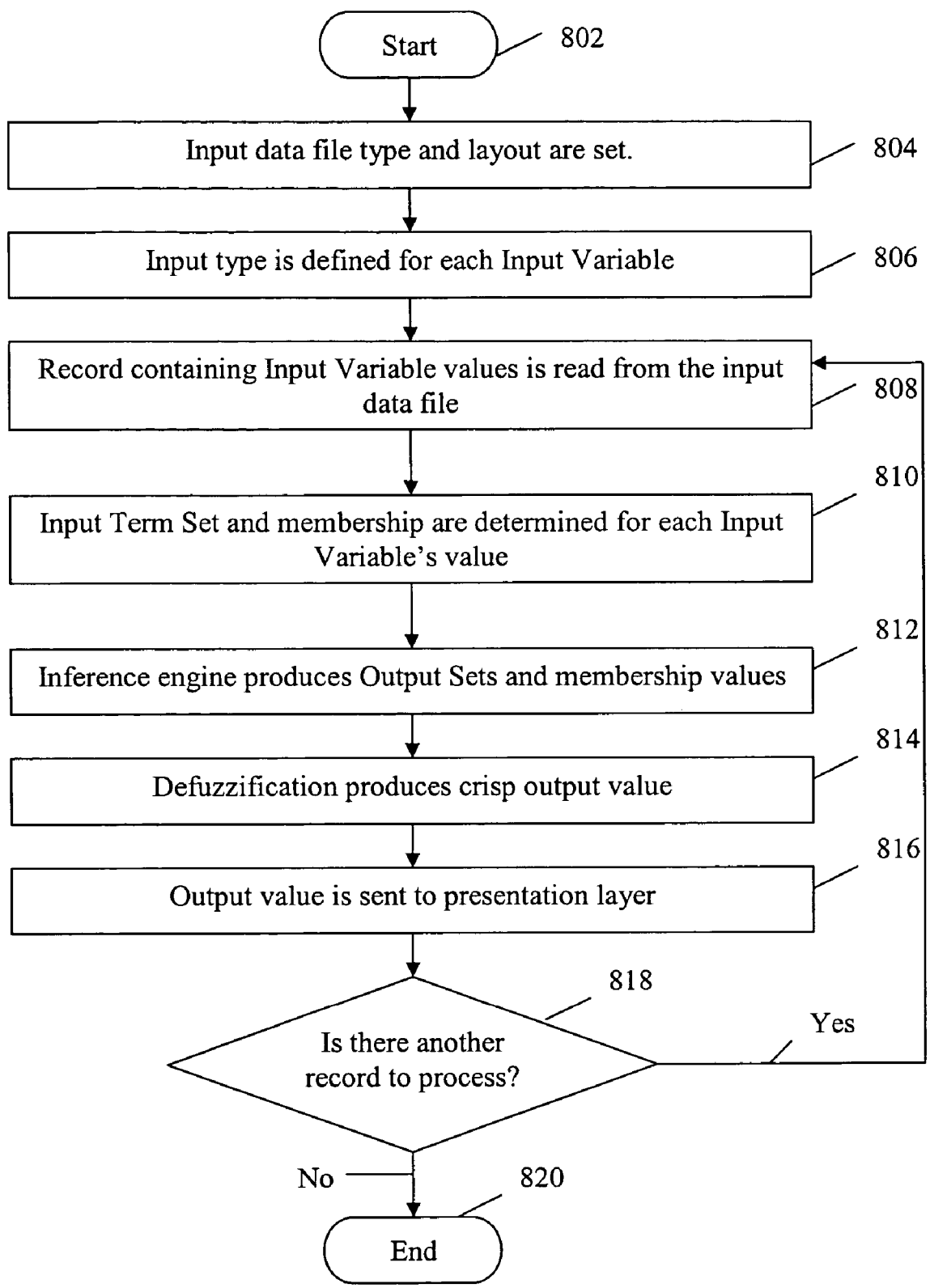
FIG. 8 is a flowchart depicting the control flow of the Decision Support operation by the Neuro-Fuzzy Expert System generated by the process described on FIG. 7.

FIG. 8 is a flowchart describing the operation and control flow of Predictive Operation by another embodiment of the Application for Neuro-Fuzzy Expert System generation 108, namely decision support. During the decision support operation, Expert System generated in step 717 and trained in step 718 is utilized as a predictive model. Each Record of an input Dataset 300 is evaluated by the Expert System and an output is predicted for each input Record in the Dataset. The control flow of FIG. 8 begins with step 802 and flows directly to step 804.

In step 804, Input Data file type and layout are set in the Data Interface 301. The Input Data file contains Records for which outputs need to be predicted based on their Attribute values. In one embodiment of the Application for Neuro-Fuzzy Expert System generation 108 Input Data is imported from the OLAP Cube in step 710. In other embodiments of the present invention the data is imported from a text file, a Microsoft Excel file, relational Database, and/or any other type of structured data. One embodiment of the GUI showing the Input Data file type and layout setup is depicted on FIG. 5.

Figure 20:
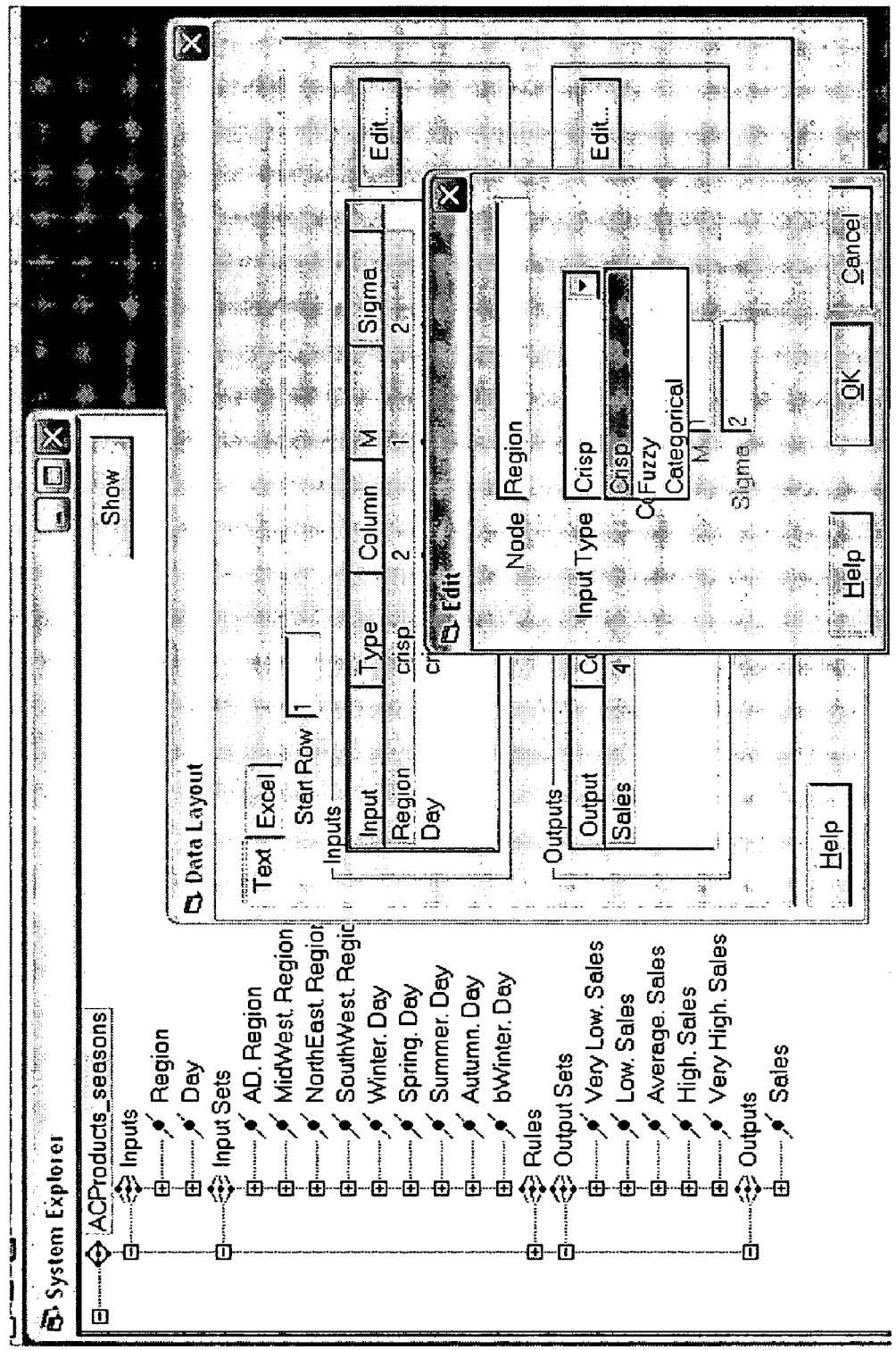
FIG. 20 is a screenshot of one embodiment of a GUI of the Application for Neuro-Fuzzy Expert System generation showing input type setup in step 806 of FIG. 8.

In step 806, input type is defined for each Input Variable in the Data Interface 301. Namely, crisp continuous (e.g. Day=15), crisp categorical (e.g. Region=Midwest), or fuzzy (e.g. Temperature=Warm). One embodiment of the GUI showing the input type setup is depicted on FIG. 20.

In step 808 one Record is read from the Input Data file. Each Record contains values for all Input Variables present in the Expert System generated in step 717 and trained in step 718.

In step 810, input source data is Fuzzified: corresponding input Term Sets and Memberships are determined for each Input Variable's value.

In step 812, input Term Sets combinations are processed by the Fuzzy Logic Inference Engine. The Inference Engine utilizes Rule Base and Neural Network Links of the Expert System trained in step 718. Output Term Sets and Membership values (e.g. Sales="High" with 0.2 Membership and Sales="Average" with 0.8 Membership) are obtained as a result of the inference process.

In step 814, output Term Sets and their Membership values are Defuzzified to produce a crisp predicted output value (e.g. Sales=$36,800).

In step 816, crisp output, corresponding to the Input Values read in step 808, is sent to the decision support presentation Layer. One embodiment of the GUI showing the decision support table is depicted on FIG. 9. Decision support outputs can be presented as charts (e.g. MS Excel), HTML pages, through data Visualization tools, reports (e.g. Crystal Reports), and other tools.

In step 818, Input Data file is checked for existence of the next Record. If it exists, then control is transferred back to the Record read in step 808, otherwise the decision support process is terminated at step 820.

Generation Of The Neuro-Fuzzy Expert System

Figure 18:
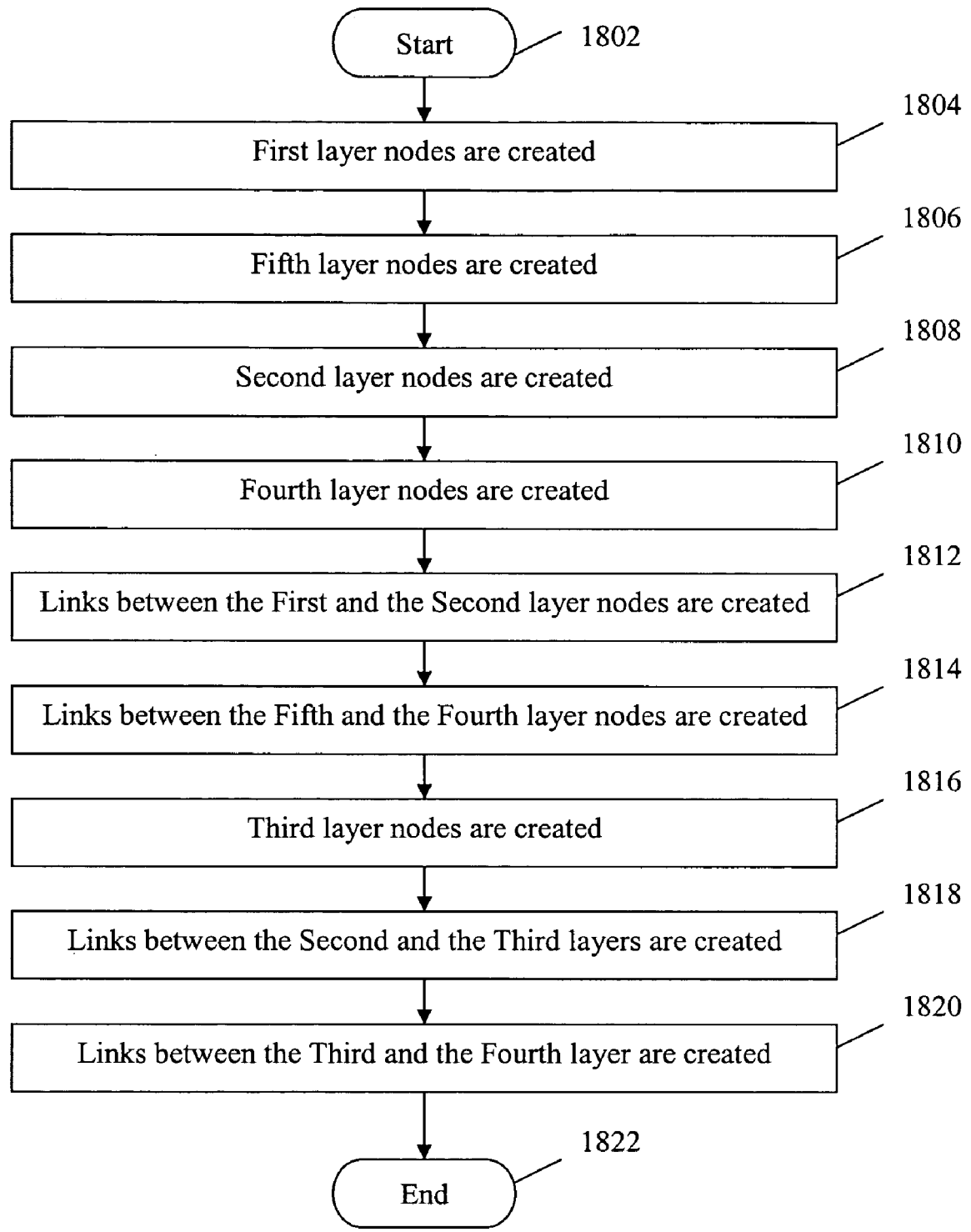
FIG. 18 is a flowchart depicting the operation and control flow of the generation of the Neuro-Fuzzy Expert System in step 717 of FIG. 7.

FIG. 18 is a flowchart depicting the operation and control flow of the Neuro-Fuzzy Expert System generation in step 717, according to the present invention. FIG. 18 describes in more detail the step 717 of FIG. 7. One embodiment of the Neuro-Fuzzy Expert System generating Application's Neural Network structure is depicted on FIG. 11.

The control flow of FIG. 18 begins with step 1802 and flows directly to step 1804.

Figure 21:
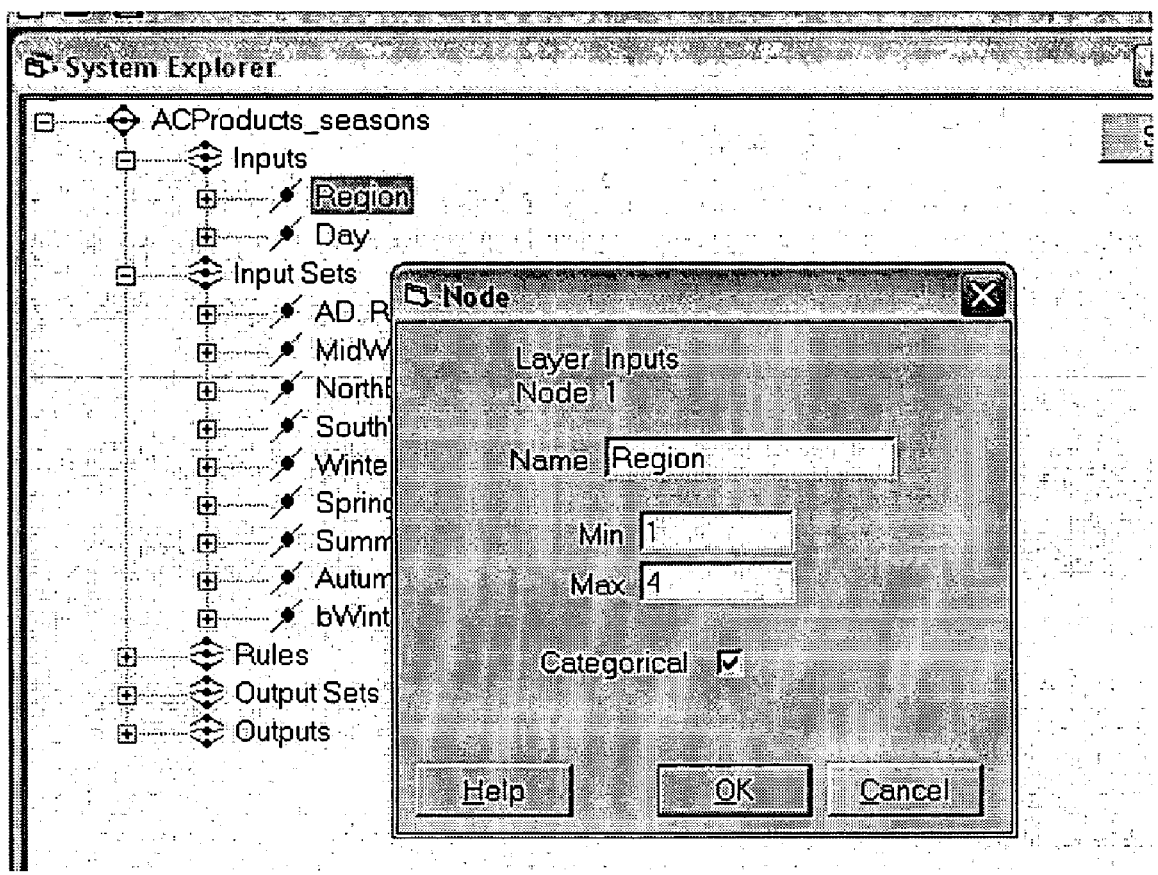
FIG. 21 is a screenshot of one embodiment of a GUI of the Application for Neuro-Fuzzy Expert System generation for manual editing of Input Variable names defined in step 1804 of FIG. 8.

In step 1804, nodes of the First Layer 1102 are created. One node for each Input Variable created in step 712. For example, for two Input Variables two nodes are created in the First Layer. Labels extracted from the OLAP Cube in step 710 are assigned to each First Layer node as the Input Variable names. In one embodiment of the Application for Neuro-Fuzzy Expert System generation 108, the Input Variable names can be modified Manually to enhance understandability of the Rules Base 1112 presented to the User 102 in Step 720. One embodiment of the GUI for editing the Input Variables is depicted on FIG. 21.

Figure 22:
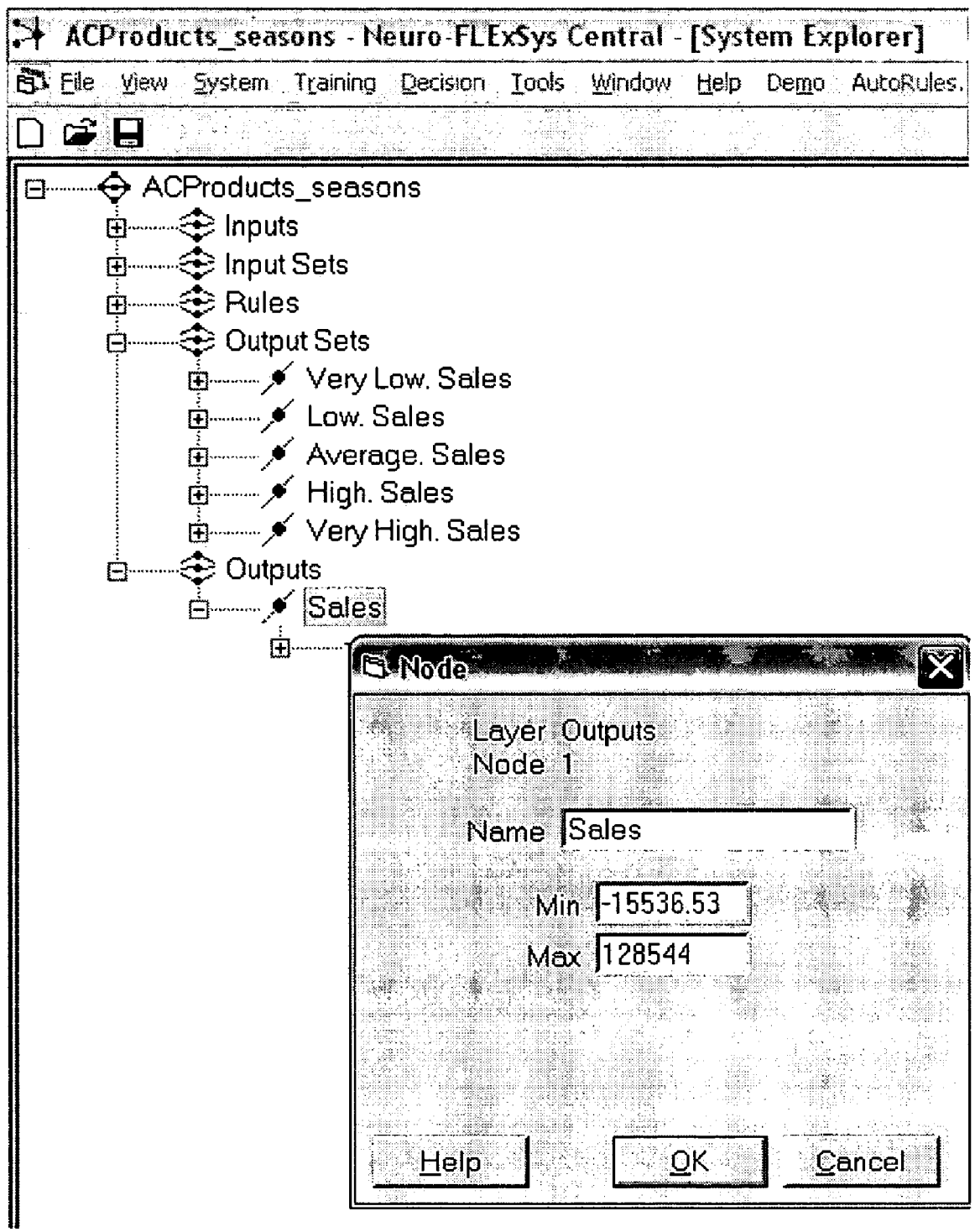
FIG. 22 is a screenshot of one embodiment of a GUI of the Application for Neuro-Fuzzy Expert System generation for manual editing of Output Variable names defined in step 1806 of FIG. 8.

In step 1806, nodes of the Fifth Layer 1110 are created. One node for each Output Variable created in step 714. For example, for one Output Variable one node is created in the Fifth Layer. Labels extracted from the OLAP Cube in step 710 are assigned to each Fifth Layer node as the Output Variable names. In one embodiment of the Application for Neuro-Fuzzy Expert System generation 108, Output Variable names can be modified Manually to enhance understandability of the Rules Base 1112 presented the User 102 in Step 720. One embodiment of the GUI for editing Output Variables is depicted on FIG. 22.

In step 1808, nodes of the Second Layer 1104 are created. One node for each Input Variable Term Set defined in step 716. For example, if one Input Variable has two Term Sets and another Input Variable has three Term Sets then five nodes are created in the Second Layer 1104.

In step 1810, nodes of the Fourth Layer 1108 are created. One node for each Output Variable Term Set defined in step 716. For example, if one Output Variable has five Term Sets then five nodes are created in the Fourth Layer.

In step 1812, Links 1114 between the First and the Second Layer nodes are created. Each node in the First Layer is linked with nodes of the Second Layer representing its Term Sets.

In step 1814, Links 1116 between the Fifth and the Fourth Layer nodes are created. Each node in the Fifth Layer is linked with nodes of the Fourth Layer representing its Term Sets. In another embodiment of the Neuro-Fuzzy Expert System generating Application's Neural Network structure an additional Layer is inserted between the Fifth and the Fourth Layers to implement Defuzzification parameter tuning in step 1214.

In step 1816, nodes of the Third Layer 1106 are created. One node is created for each unique combination of the Second Layer nodes representing Term Sets for different Input Variables. For example, if one Input Variable has two Term Sets and another Input Variable has three Term Sets then six nodes are created in the Third Layer.

In step 1818, Links 1118 between the Second and the Third Layers are created. Each node in the Second Layer is linked with nodes in the Third Layer according to the unique combination represented by the Third Layer node.

In step 1820, Links 1120 between the Third and the Fourth Layers are created. Initially, before the Neural Network Training, each node in the Third Layer is linked with each node in the Fourth Layer and the Links have equal Weights. Subsequently, the Weights are determined by Competitive Learning or a similar Neural Network Training algorithm with possible elimination of the weak rules. The Link training is described in FIG. 12, step 1206 below.

In step 1822, the process of generation of the Neuro-Fuzzy Expert System is terminated.

Training Of The Neuro-Fuzzy Expert System

Figure 12:
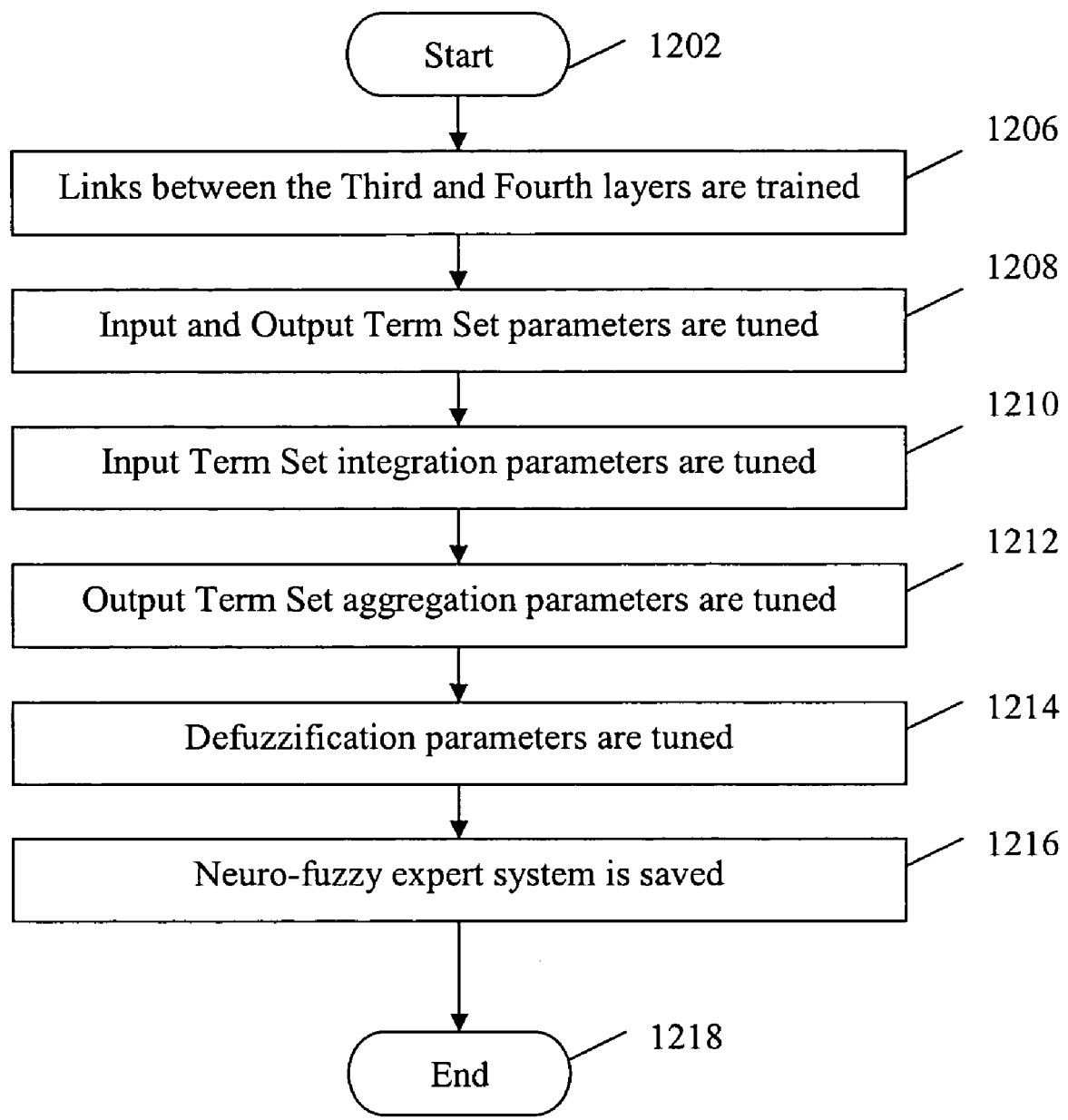
FIG. 12 is a flowchart depicting the operation and control flow of the Neuro-Fuzzy Expert System Training process of step 718 of FIG. 7.

FIG. 12 is a flowchart depicting the operation and control flow of the Neuro-Fuzzy Expert System Training process of step 718, FIG. 7, according to the present invention. FIG. 12 describes in more detail the step 718 of FIG. 7. The control flow of FIG. 12 begins with step 1202 and flows directly to step 1206.

Figure 23:
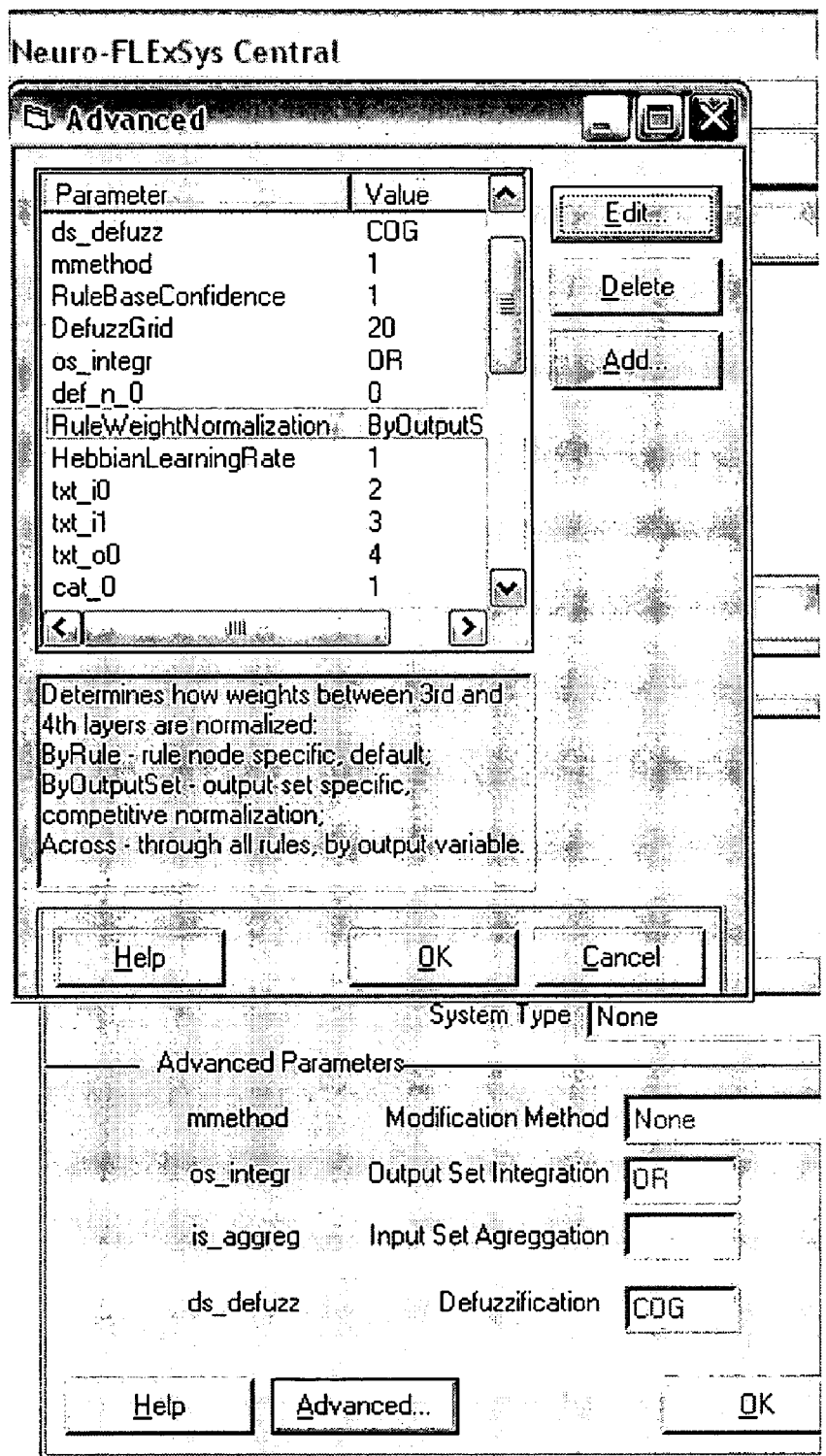
FIG. 23 is a screenshot of one embodiment of a GUI of the Application for Neuro-Fuzzy Expert System generation showing setup of the Competitive Learning parameters used in step 1206 FIG. 12.

In step 1206, Links between the Third and Fourth Layers are trained on the inputs and outputs from the Training Dataset. In one embodiment of the Application for Neuro-Fuzzy Expert System generation 108, Competitive Learning algorithm determines the Weights of the Links between the Third and Fourth Layers with possible elimination (pruning) of the weak Links. One embodiment of the GUI showing the Competitive Learning parameters (e.g. RuleWeightNormalization) setup is depicted on FIG. 23.

Figure 24:
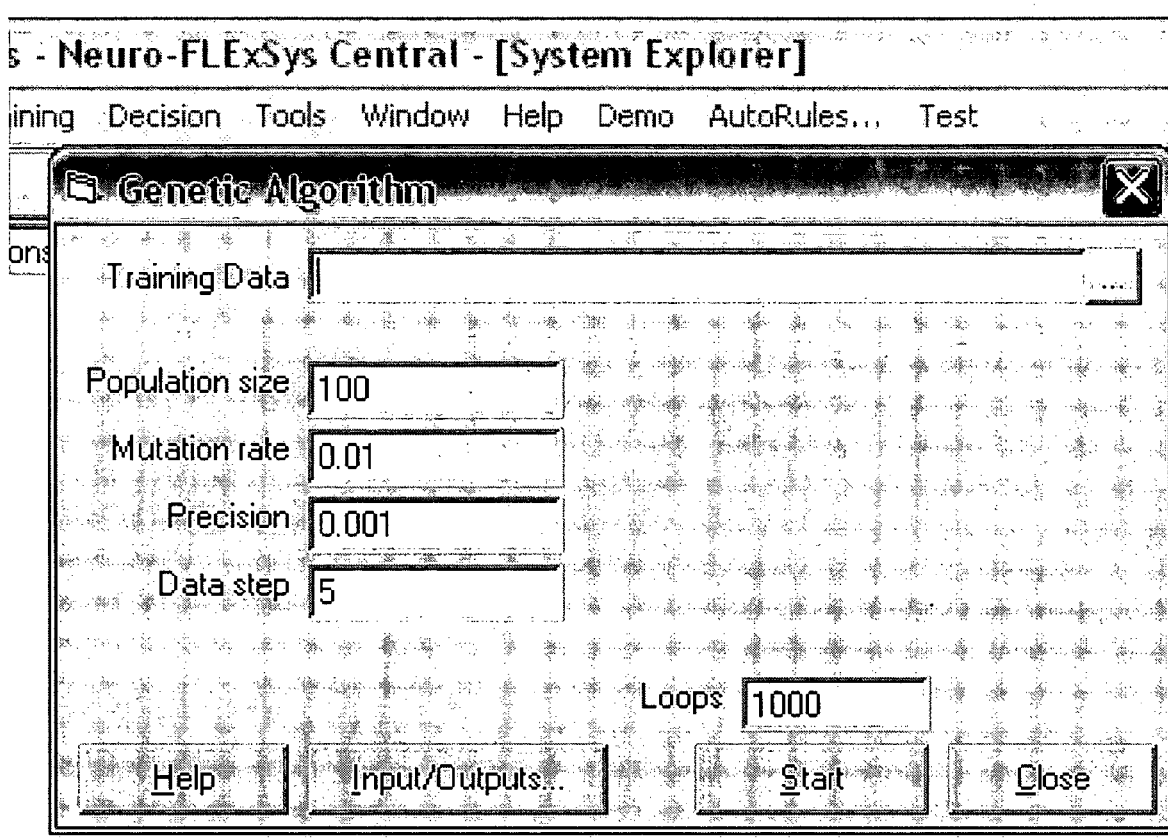
FIG. 24 is a screenshot of one embodiment of a GUI of the Application for Neuro-Fuzzy Expert System generation showing setup of the Genetic Algorithm parameters utilized in step 1208 of FIG. 12.

In step 1208, input and output Term Set parameters (Second and Fourth Layer nodes) are tuned based on the inputs and outputs from the Training Dataset. In one embodiment of the Application for Neuro-Fuzzy Expert System generation 108, the parameters are tuned by Backpropagation and Genetic Algorithm. One embodiment of the GUI showing the Genetic Algorithm parameters setup is depicted on FIG. 24.

In step 1210, input Term Set Integration parameters are tuned. In one embodiment of the Application for Neuro-Fuzzy Expert System generation 108, orness (S-OWA) parameters are tuned by the Genetic Algorithm.

In step 1212, output Term Set Aggregation parameters are tuned. In one embodiment of the Application for Neuro-Fuzzy Expert System generation 108, ALSO vs. ELSE Aggregation parameters are tuned by the Genetic Algorithm.

In step 1214, Defuzzification parameters are tuned. In one embodiment of the Application for Neuro-Fuzzy Expert System generation 108, these parameters are represented by the Confidence Levels spread evenly throughout the Fuzzy Set resulted from the Aggregation of the output Term Sets. The Confidence Levels are similar to the alpha parameters used in the CBADD (S. K. Halgamuge, "A trainable transparent universal approximator for Defuzzification in Mamdani-type neuro-fuzzy controllers," in IEEE Transactions on Fuzzy Systems, vol. 6, No. 2, pp. 304-313, May 1998, which is hereby incorporated by reference in its entirety) Defuzzification method. These Defuzzification parameters are tuned by the Genetic Algorithm. In one embodiment of the Application for Neuro-Fuzzy Expert System generation 108, the algorithm utilizes Combinability Relationship (Yager, R. R. "On the use of combinability functions for intelligent Defuzzification," Proceedings of 1995 IEEE International Conference on Fuzzy Systems, Yokohama, Japan, 193-198 vol. 1, 1995, which is hereby incorporated by reference in its entirety) in its Crossover operation. In another embodiment of the Application for Neuro-Fuzzy Expert System generation 108, the Genetic Algorithm utilizes distribution of the Error differential in its Crossover operation. Each individual in the Genetic Algorithm's population is represented by a set of Confidence Levels. Share of the Error contributed by each Confidence Level is calculated. The Crossover operation selects Confidence Levels with low Error shares from individuals to produce a next generation individual.

In step 1216, the trained Neuro-Fuzzy Expert System is saved. In one embodiment of the Application for Neuro-Fuzzy Expert System generation 108, the structure and parameters of the Neuro-Fuzzy Expert System are saved in a text file. In another embodiment of the present invention, they are saved in a relational Database. In yet another embodiment of the present invention, the structure and parameters of the Neuro-Fuzzy Expert System are saved in an XML file.

In step 1218, the process of Training Expert System is terminated. Thus, in one embodiment of the Application for Neuro-Fuzzy Expert System generation 108, Patterns of data imported from the OLAP Cube in step 710 become embedded in the Neuro-Fuzzy Expert System's parameters and its Rule Base. The Patterns are reviewed by the User 102 in step 720.

Non-limiting Hardware Embodiments

Overall, the present invention can be realized in hardware or a combination of hardware and software. An information processing system according to a preferred embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 26:
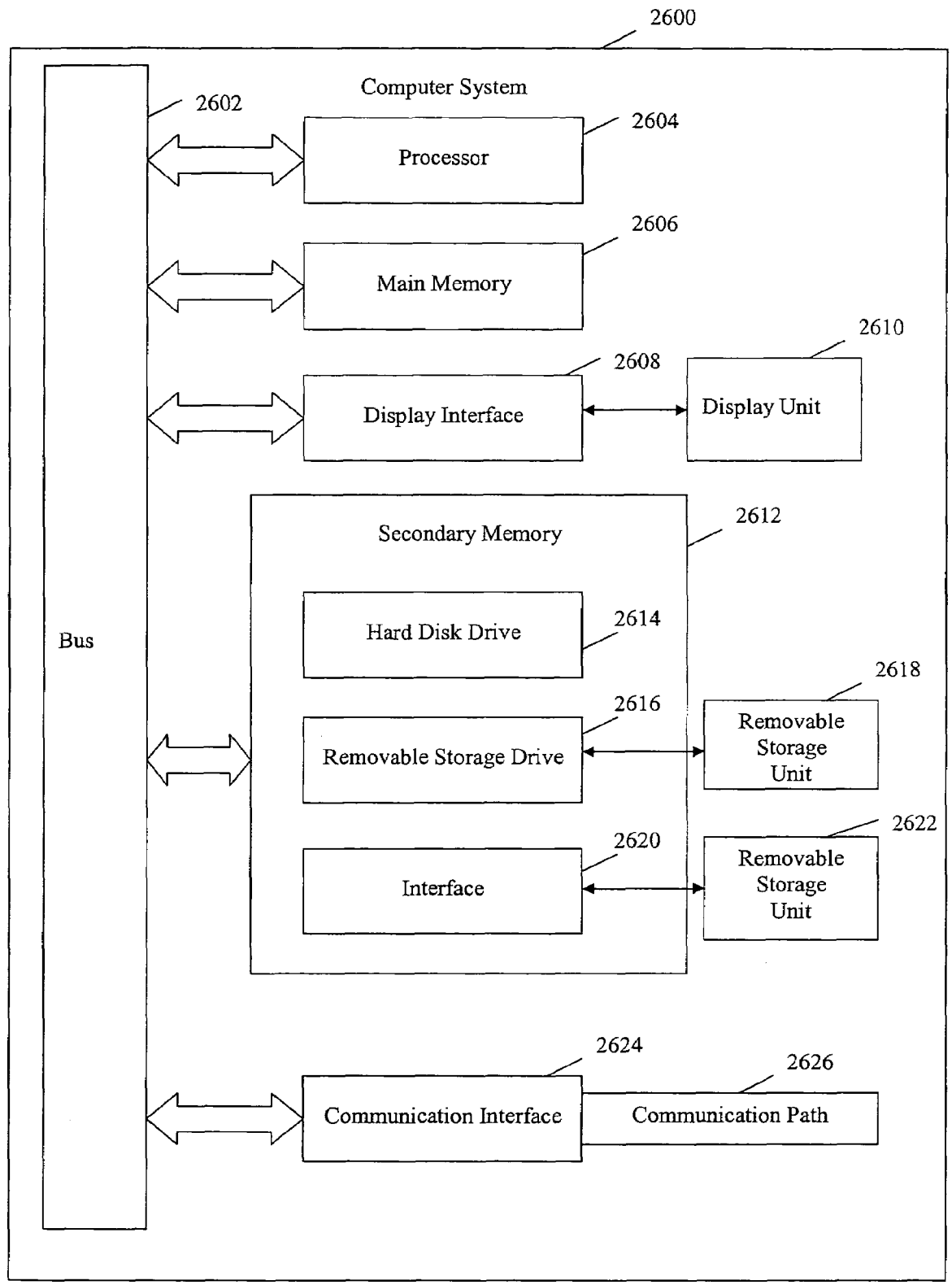
FIG. 26 is a standardized computer system diagram.

An example of a computer system 2600 is shown in FIG. 26. The computer system 2600 includes one or more processors, such as processor 2604. The processor 2604 is connected to a communication infrastructure 2602 such as a communications bus, crossover bar, or network. Various software embodiments are described in terms of this exemplary computer system. After reading this description, it will become apparent to a person of ordinary skill in the relevant art(s) how to implement the invention using other computer systems and/or computer architectures.

Computer system 2600 includes a display Interface 2608 that forwards Graphics, text, and other data from the communication infrastructure 2602 (or from a frame buffer not shown) for display on the display unit 2610. Computer system 2600 also includes a main memory 2606, preferably random access memory (RAM), and optionally includes a secondary memory 2612. The secondary memory 2612 includes, for example, a hard disk drive 2614 and/or a removable storage drive 2616, representing a floppy disk drive, a magnetic tape drive, an optical disk drive, etc. The removable storage drive 2616 reads from and/or writes to a removable storage unit 2618 in a manner well known to those having ordinary skill in the art. Removable storage unit 2618, represents a floppy disk, magnetic tape, optical disk, etc. which is read by and written to by removable storage drive 2616. As will be appreciated, the removable storage unit 2618 includes a computer usable storage medium having stored therein computer software and/or data.

In alternative embodiments, the secondary memory 2612 includes other similar means for allowing computer programs or other instructions to be loaded into computer system 2600. Such means include, for example, a removable storage unit 2622 and an Interface 2620. Examples of such include a program cartridge and cartridge Interface (such as that found in video game devices), a removable memory chip (such as an EPROM, or PROM) and associated socket, and other removable storage units 2622 and Interfaces 2620 which allow software and data to be transferred from the removable storage unit 2622 to computer system 2600.

Computer system 2600 also optionally includes a communications Interface 2624. Communications Interface 2624 allows software and data to be transferred between computer system 2600 and external devices. Examples of communications Interface 2624 include a modem, a network Interface (such as an Ethernet card), a communications port, a PCM-CIA slot and card, etc. Software and data transferred via communications Interface 2624 are in the form of signals which may be, for example, electronic, electromagnetic, optical, or other signals capable of being received by communications Interface 2624. These signals are provided to communications Interface 2624 via a communications path (i.e., channel) 2626. This channel 2626 carries signals and is implemented using wire or cable, fiber optics, a phone line, a cellular phone link, an RF link, and/or other communications channels.

The terms "computer program medium," "computer usable medium," and "computer readable medium" are used to generally refer to media such as main memory 2606 and secondary memory 2612, removable storage drive 2616, a hard disk installed in hard disk drive 2614, and signals. These computer program products are means for providing software and/or image data to computer system 2600. The computer readable medium allows the computer system 2600 to read data, instructions, messages or message packets, and other computer readable information from the computer readable medium. The computer readable medium, for example, includes non-volatile memory, such as Floppy, ROM, flash memory, disk drive memory, CD-ROM, and other permanent storage. It is useful, for example, for transporting information, such as data and computer instructions, between computer systems 2600. Furthermore, the computer readable medium comprises computer readable information in a transitory state medium such as a network link and/or a network Interface, including a wired network or a wireless network, that allow a computer to read such computer readable information.

Computer programs (also called computer control logic) are stored in main memory 2606 and/or secondary memory 2612. Computer programs are also received via communications Interface 2624. Such computer programs, when executed, enable the computer system 2600 to perform the features of the present invention as discussed herein. In particular, the computer programs, when executed, enable the processor 2604 to perform the features of the computer system 2600. Accordingly, such computer programs represent controllers of the computer system 2600.

Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such Applications, modifications, and embodiments within the scope of the present invention.

What is claimed is:

1. A method for automatic generation of a hybrid neuro-fuzzy expert system, where a fuzzy logic expert system is implemented as a neural network, the method comprising:
   receiving from a user interface a selection for whether
      a given input data type is at least one of a crisp continuous data type, a crisp categorical data type, and a fuzzy data type, and
      a given input data structure of input data is at least one of text file, a spreadsheet, a relational database, an online analytical processing (OLAP) cube,
   a multidimensional database, and a chart,
   wherein the user interface permits a designation, from the given input data structure, of both
      at least a single piece of information for input attributes, and
      at least a single piece of information for output attributes;
   generating automatically a neuro-fuzzy expert system from the input data with a neural network structure comprising a plurality of layers including:
      a first layer with a number of first layer nodes equal to a number of input attributes, and the each first layer node receiving values of at least one input attribute and passing the values as inputs to a second layer;
      the second layer with a plurality of second layer nodes with a number of second layer nodes determined by at least one clustering algorithm performed on a set of values associated to each input attribute with one second layer node defined for at least one cluster, and links established between each second layer node and one first layer node corresponding to that input attribute for fuzzifying by determining each membership value of inputs received from the first layer, and passing the membership values to a third layer;
      the third layer with a plurality of third layer nodes with each third layer node representing a unique combination of nodes in the second layer that belong to different input attributes, and links established between each third layer node and each second layer node from a corresponding unique combination for integrating inputs from second layer nodes and passing them to a fourth layer;
      the fourth layer with a plurality of fourth layer nodes with a number of fourth layer nodes determined by at least one clustering algorithm on a set of values associated to each output attribute with one fourth layer node defined for at least one cluster, and links established between each fourth layer node and each node in the third layer for applying weights to inputs from the third layer and passing them to a fifth layer;
      the fifth layer with at least one fifth layer node with a number of fifth layer nodes determined by a number of output attributes, and links established between each fourth layer node and one fifth layer node for aggregating inputs from the fourth layer and for defuzzifying the inputs from the fourth layer to produce crisp output value;
   training of a neural network of the neuro-fuzzy expert system with the input and output attributes' data so that a weight of at least one link between the third layer and fourth layer is adjusted based on a signal that comes from at least one fourth layer node and a signal from at least one third layer node; and
   presenting to a user of at least one result representing information embedded in a plurality of parameters and in at least one structure of the neuro-fuzzy expert system which has been trained.

2. The method of claim 1, wherein input data includes:
   access to multidimensional data from an OLAP Cube;
   designating at least one of a measure for at least one of the input attributes and the output attributes;
   designating automatically at least one dimension of the OLAP Cube as input attribute.

3. The method of claim 1, wherein automatic neuro-fuzzy expert system generation includes:
   clustering on at least one of input attribute data and output attribute data;
   selecting of a result from clustering based on a cluster validity index; and
   receiving adjustments from the user into a rule base of the neuro-fuzzy expert system.

4. The method of claim 1, wherein training of an expert system neural network on the input data includes training by:
tuning of at least one confidence level defuzzification parameter by at least one of a genetic algorithm and a fuzzy logic controller (FLC) type system which is implemented with at least one additional layer between the fourth layer and the fifth layer in the plurality of layers in the neural network structure.

5. The method of claim 4, wherein the training of an expert system neural network on the input data includes tuning of defuzzification parameters by the genetic algorithm utilizing at least one of a distribution of error differential and a combinability relationship during a crossover operation of the genetic algorithm.

6. The method of claim 1, wherein the presenting of the at least one result includes:
displaying logic rules from a rule base inferred during the training of the neural network with multi level sort options; and
displaying at least one of the neural network's
nodes,
links, and
weights
utilizing data visualization techniques.

7. A computer program product for automatic generation of a hybrid neuro-fuzzy expert system, where a fuzzy logic expert system is implemented as a neural network, the computer program product comprising:
a storage medium readable by a processing circuit and storing computer instructions for execution by the processing circuit for performing a method comprising:
receiving from a user interface a selection-for whether
a given input data type is at least one of a crisp continuous data type, a crisp categorical data type, and a fuzzy data type, and
a given input data structure of input data is at least one of text file, a spreadsheet, a relational database, an online analytical processing (OLAP) cube, a multidimensional database, and a chart,
wherein the user interface permits a designation, from the given input data structure, of both
at least a single piece of information for input attributes, and
at least a single piece of information for output attributes; generating automatically a neuro-fuzzy expert system from the input data with a neural network structure comprising a plurality of layers including:
a first layer with a number of first layer nodes equal to a number of input attributes, and the each first layer node receiving values of at least one input attribute and passing the values as inputs to a second layer;
the second layer with a plurality of second layer nodes with a number of second layer nodes determined by at least one clustering algorithm performed on a set of values associated to each input attribute with one second layer node defined for at least one cluster, and links established between each second layer node and one first layer node corresponding to that input attribute for fuzzifying by determining each membership value of inputs received from the first layer, and passing the membership values to a third layer;
the third layer with a plurality of third layer nodes with each third layer node representing a unique combination of nodes in the second layer that belong to different input attributes, and links established between each third layer node and each second layer node from a corresponding unique combination for integrating inputs from second layer nodes and passing them to a fourth layer;
the fourth layer with a plurality of fourth layer nodes with a number of fourth layer nodes determined by at least one clustering algorithm on a set of values associated to each output attribute with one fourth layer node defined for at least one cluster, and links established between each fourth layer node and each node in the third layer for applying weights to inputs from the third layer and passing them to a fifth layer;
the fifth layer with at least one fifth layer node with a number of fifth layer nodes determined by a number of output attributes, and links established between each fourth layer node and one fifth layer node for aggregating inputs from the fourth layer and for defuzzifying the inputs from the fourth layer to produce crisp output value;
training of a neural network of the neuro-fuzzy expert system with the input and output attributes' data so that a weight of at least one link between the third layer and fourth layer is adjusted based on a signal that comes from at least one fourth layer node and a signal from at least one third layer node; and
presenting to a user of at least one result representing information embedded in a plurality of parameters and in at least one structure of the neuro-fuzzy expert system which has been trained.

8. The computer program product of claim 7, wherein the input data interface includes:
access to multidimensional data from an OLAP cube;
designating at least one of a measure for at least one of the input attributes and the output attributes; and
designating automatically at least one dimension of the OLAP cube as one of the input attributes.

9. The computer program product of claim 7, wherein the input data interface includes:
clustering on data corresponding to at least one of the input attributes and the output attributes;
selecting of a result from clustering based on a cluster validity index; and
receiving adjustments from the user into a rule base of the neuro-fuzzy expert system.

10. The computer program product of claim 7, wherein the training of an expert system neural network on the input data includes training by:
tuning of at least one confidence level defuzzification parameter by at least one of a genetic algorithm and a fuzzy logic controller (FLO) type system which is implemented with at least one additional layer between the fourth layer and the fifth layer in the plurality of layers in the neural network structure.

11. The computer program product of claim 10, wherein the training of an expert system neural network on the input data includes tuning of defuzzification parameters by the genetic algorithm utilizing at least one of a distribution of error differential and a combinability relationship during a crossover operation of the genetic algorithm.

12. The computer program product of claim 7, wherein the presenting at least one result includes:
displaying logic rules from a rule base inferred during the training of the neural network with multi level sort options; and
displaying at least one of the neural network's
nodes,
links, and
weights
utilizing data visualization techniques.

13. A system for automatic generation of a hybrid neuro-fuzzy expert system, where a fuzzy logic expert system is implemented as a neural network, the system comprising:

a user interface for receiving for whether
- a given input data type is at least one of a crisp continuous data type, a crisp categorical data type and a fuzzy data type, and
- a given input data structure of input data is at least one of text file, a spreadsheet, a relational database, an online analytical processing (OLAP) cube, a multidimensional database, and a chart, wherein the user interface permits a designation, from the given input data structure, of both
- at least a single piece of information for input attributes, and
- at least a single piece of information for output attributes;

an application for generating automatically a neuro-fuzzy expert system from the input data with a neural network structure comprising a plurality of layers including:
- a first layer with a number of first layer nodes equal to a number of input attributes, and the each first layer node receiving values of at least one input attribute and passing the values as inputs to a second layer;
- the second layer with a plurality of second layer nodes with a number of second layer nodes determined by at least one clustering algorithm performed on a set of values associated to each input attribute with one second layer node defined for at least one cluster, and links established between each second layer node and one first layer node corresponding to that input attribute for fuzzifying by determining each membership value of inputs received from the first layer, and passing the membership values to a third layer;
- the third layer with a plurality of third layer nodes with each third layer node representing a unique combination of nodes in the second layer that belong to different input attributes, and links established between each third layer node and each second layer node from a corresponding unique combination for integrating inputs from second layer nodes and passing them to a fourth layer;
- the fourth layer with a plurality of fourth layer nodes with a number of fourth layer nodes determined by at least one clustering algorithm on a set of values associated to each output attribute with one fourth layer node defined for at least one cluster, and links established between each fourth layer node and each node in the third layer for applying weights to inputs from the third layer and passing them to a fifth layer;
- the fifth layer with at least one fifth layer node with a number of fifth layer nodes determined by a number of output attributes, and links established between each fourth layer node and one fifth layer node for aggregating inputs from the fourth layer and for defuzzifying the inputs from the fourth layer to produce crisp output value;

a neural network of the neuro-fuzzy expert system trained with the input and output attributes' data so that a weight of at least one link between the third layer and fourth layer is adjusted based on a signal that comes from at least one fourth layer node and a signal from at least one third layer node; and a display interface for presenting to a user of at least one result representing information embedded in a plurality of parameters and in at least one structure of the neuro-fuzzy expert system which has been trained.

14. The system of claim 13, wherein the input data interface includes:
- means for accessing multidimensional data from an OLAP cube;
- means for designating at least one of a measure for at least one of the input attributes and the output attributes; and
- means for designating automatically at least one dimension of the OLAP cube as one of the input attributes.

15. The system of claim 13, wherein automatic neuro-fuzzy expert system generation includes:
- means for clustering on data corresponding to at least one of the input attributes and the output attributes;
- means for selecting of a result from clustering based on a cluster validity index; and
- means for receiving adjustments from the user into a rule base of the neuro-fuzzy expert system.

16. The system of claim 13, wherein the expert system neural network trained on the input data includes training by:
- tuning of at least one confidence level defuzzification parameter by at least one of a genetic algorithm and a fuzzy logic controller (FLC) type system which is implemented with at least one additional layer between the fourth layer and the fifth layer in the plurality of layers in the neural network structure.

17. The system of claim 16, wherein the expert system neural network trained by input data includes tuning of defuzzification parameters by the genetic algorithm utilizing at least one of a distribution of error differential and a combinability relationship during a crossover operation of the genetic algorithm.

18. The system of claim 13, wherein the user interface for presenting to a user of the at least one result includes:
- means for displaying logic rules from a rule base inferred during a training of the neural network with multi level sort options; and
- means displaying at least one of the neural network's
  nodes,
  links, and
  weights
utilizing data visualization techniques.

* * * * *